(12) United States Patent
Bosch et al.

(10) Patent No.: US 12,019,587 B2
(45) Date of Patent: Jun. 25, 2024

(54) METADATA-BASED RECOMMENDATIONS OF FILE NAMES

(71) Applicant: Procore Technologies, Inc., Carpinteria, CA (US)

(72) Inventors: Matthew Croy Bosch, Satellite Beach, FL (US); Riley Scott Herman, Austin, TX (US); Dallas Hall, Marysville, WA (US); Kathryn Gallagher, Austin, TX (US)

(73) Assignee: Procore Technologies, Inc., Carpinteria, CA (US)

( * ) Notice: Subject to any disclaimer, the term of this patent is extended or adjusted under 35 U.S.C. 154(b) by 0 days.

(21) Appl. No.: 17/702,314

(22) Filed: Mar. 23, 2022

(65) Prior Publication Data

US 2023/0305998 A1 Sep. 28, 2023

(51) Int. Cl.
*G06F 16/16* (2019.01)
*G06Q 10/10* (2023.01)

(52) U.S. Cl.
CPC .......... *G06F 16/166* (2019.01); *G06F 16/168* (2019.01); *G06Q 10/103* (2013.01)

(58) Field of Classification Search
CPC .... G06F 16/166; G06F 16/168; G06Q 10/103
See application file for complete search history.

(56) References Cited

U.S. PATENT DOCUMENTS 8,843,535 B2* 9/2014 Prasad ................... G06F 16/119
707/825
8,903,761 B1* 12/2014 Zayas ................. H04L 67/1097
707/602
10,303,690 B1* 5/2019 Todd .................... G06F 16/2457
2007/0192377 A1* 8/2007 Gies ....................... G06F 16/168
2013/0091105 A1* 4/2013 Bhave ..................... G06F 16/27
707/693

(Continued)

FOREIGN PATENT DOCUMENTS

KR 10-2195899 B1 12/2020
WO 2020/230154 A1 11/2020

OTHER PUBLICATIONS

Alhoz, Khaled, "Information Management Workflows Aligned with ISO 19650 Principals in the ArcGIS Platform—Delivery Phase of an Asset", ISO 19650 Standards in the ArcGIS Platform, Aug. 30, 2021, 20 pages, printed from the World Wide Web on Dec. 31, 2021.

(Continued)

*Primary Examiner* — Angelica Ruiz
(74) *Attorney, Agent, or Firm* — Lee Sullivan Shea & Smith LLP

(57) ABSTRACT

A computing platform is configured to: (i) receive, from a first client station, a data file; (ii) obtain metadata associated with the data file; (iii) determine, based on at least a first set of metadata from the obtained metadata associated with the data file, a naming structure to use for the data file; (iv) generate, based on the determined naming structure and at least a second set of metadata from the obtained metadata, a proposed name for the data file; and (v) transmit, to a second client station, a communication identifying the proposed name and thereby cause an indication of the proposed name for the data file to be presented at a user interface of the second client station.

20 Claims, 9 Drawing Sheets

(56) References Cited

U.S. PATENT DOCUMENTS

| | | | |
|---|---|---|---|
| 2014/0019494 A1* | 1/2014 | Tang | G06F 16/16 |
| | | | 707/825 |
| 2016/0162478 A1 | 6/2016 | Blassin et al. | |
| 2019/0129955 A1* | 5/2019 | Greenberger | H04L 67/1097 |
| 2019/0197124 A1 | 6/2019 | Kaneko et al. | |
| 2020/0042498 A1* | 2/2020 | Zwiefelhofer | G06F 16/93 |
| 2020/0097565 A1* | 3/2020 | Males | G06F 40/253 |
| 2020/0151142 A1* | 5/2020 | Mamidi | G06F 12/0888 |
| 2020/0226182 A1 | 7/2020 | Dang et al. | |
| 2021/0109984 A1* | 4/2021 | Cohen | G06F 16/958 |
| 2021/0271636 A1 | 9/2021 | Watanabe | |
| 2021/0271716 A1 | 9/2021 | Watanabe | |
| 2021/0397670 A1* | 12/2021 | Cohen | G06F 3/04817 |

OTHER PUBLICATIONS

Yee, Angela et al., "ISO 19650, the Common Data Environment, and Autodesk Construction Cloud" (https://medium.com/autodesk-university/iso-19650-the-common-data-environment-and-autodesk-construction-cloud-d97a9d9a17af), Autodesk University, Jun. 23, 2021, 11 pages, printed from the World Wide Web on Mar. 28, 2022.

"A Simple BIM Naming Convention Based on ISO 19650 Part 1," (https://www.bimicon.com/bim-naming-convention-based-on-iso19650-part1/), BIM Icon, 2021, 9 pages, printed from the World Wide Web on Mar. 28, 2022.

"Customize an Applied Naming Standard," (https://knowledge.autodesk.com/search-result/caas/CloudHelp/cloudhelp/ENU/BIM360D-Document-Management/files/common-data-environment/Customize-Naming-Standard-html.html), Knowledge Network, Jan. 4, 2022, 9 pages, printed from the World Wide Web on Jan. 16, 2022.

U.S. Appl. No. 17/578,894, filed Jan. 19, 2022, with inventors Bosch, Matthew Croy et al., entitled "Metadata-Based Recommendations of Workflow for Data Files."

Screen captures from YouTube video clip entitled "Autodesk Naming Standard to ISO 19650 Workflows," uploaded on Nov. 9, 2021, 40 pages, Retrieved from Internet: https://www.youtube.com/watch?v=IEF7RJCRV7c on Apr. 1, 2022.

Screen captures from YouTube video clip entitled "Autodesk BIM 360 Docs-ISO 19650 Naming Containers," uploaded on May 25, 2021, 47 pages, Retrieved from Internet: https://www.youtube.com/watch?v=j__080pNiFA on Apr. 1, 2022.

Abioye, Sofiat O. et al., "Artificial Intelligence in the Construction Industry: A Review of Present Status, Opportunities and Future Challenges", Journal of Building Engineering, vol. 44, Oct. 5, 2021, 13 pages.

International Searching Authority, PCT International Search Report and Written Opinion, PCT International Application No. PCT/US2023/015936, dated Jun. 29, 2023, 10 pages.

\* cited by examiner

FIG. 7B

Create Conditional Rule

If the document type is one of the following:

Type*

Select type

Then the fol...

Naming Stand...

Select namin...

Document Fie...

Search fields

Search

*Select one or more types.*

Drawing
Specification
Model
Report
Form
Inspection
Photo
Submittal
Other

Cancel    Apply

| Name | Required |
|------|----------|
| Project | Lorem ipsum dolar. |
| Originator | Lorem ipsum dolar. |
| Number | ...m dolar. |

1 - 10 of 19   Page: 1

METADATA-BASED RECOMMENDATIONS OF FILE NAMES

BACKGROUND

Construction projects are often complex endeavors involving the coordination of many professionals across several discrete phases. Typically, a construction project commences with a design phase, where architects design the overall shape and layout of a construction project, such as a building. Next, engineers engage in a planning phase where they take the architects' designs and produce engineering drawings and plans for the construction of the project. At this time, engineers may also design various portions of the project's infrastructure, such as HVAC, plumbing, electrical, etc., and produce plans reflecting these designs as well. After, or perhaps in conjunction with, the planning phase, contractors may engage in a logistics phase to review these plans and begin to allocate various resources to the project, including determining what materials to purchase, scheduling delivery, and developing a plan for carrying out the actual construction of the project. Finally, during the construction phase, construction professionals begin to construct the project based on the finalized plans.

OVERVIEW

When approaching, planning, and carrying out a construction project, it is often necessary to control and manage data files associated with the construction project to ensure that such data files are appropriately created, captured, accessed, managed, and stored (e.g., in a manner that reflects business, corporate and regulatory compliance requirements). To assist with these tasks, software applications have been developed that enable control and management of electronic data files associated with construction projects. However, because construction projects may be complex endeavors involving multiple different phases, large numbers of data files (which may be on the order of thousands, tens of thousands, hundreds of thousands, etc.), and coordination of multiple different teams of individuals, organizations may face various challenges when attempting to use existing software applications to control and manage data files associated with construction projects, examples of which may include PDF files, JPEG files, DWG files, Building Information Model (BIM) files, and Computer-Aided Design (CAD) files (e.g., NWF files), among other possible file types.

One example challenge faced by organizations attempting to control and manage data files associated with a construction project is that, without appropriate control mechanisms in place, there is a risk that unreliable, inaccurate, and/or out-of-date data files could be disseminated among teams and individuals involved in the construction project, which may lead to a host of problems on the construction project— including scheduling delays and other costly mistakes. To address this challenge, technology is now being developed to help control the reliability and quality of data files that are disseminated among teams and individuals involved in the construction project.

For instance, some software applications have begun to implement approaches for controlling and managing data files associated with a construction project whereby all new data files uploaded to the software application are required to undergo a review and approval process before such data files can be disseminated to others involved in the construction project. A framework for such an approach is defined in International Organization for Standardization (ISO) 19650, which is an international standard for managing information over the lifecycle of a built asset. A software application designed in accordance with ISO 19650 may maintain a centralized repository that serves as the single source of truth for electronic data files associated with a construction project, which is referred to as a common data environment (CDE), and may then impose certain requirements that each data file associated with the construction project needs to meet before it can be placed into the CDE— including that the naming of data files placed in the CDE meet certain requirements.

In this regard, an organization may wish to use a given naming structure when naming data files, so as to ensure that data files meet various naming requirements for data files implemented by the organization, such as the naming requirements specified in ISO 19650 and/or other naming requirements implemented by the organization. A naming structure may define a particular set of data fields that are sequenced in a particular way, perhaps along with one or more delimiters that may be positioned between pairs of data fields. Applying a well-defined naming structure to data files can be an important factor for control and management of data files. For instance, applying a well-defined naming structure to data files that are shared among teams and individuals may help to reduce or limit misunderstandings and/or errors when exchanging the data files among the teams and individuals. Further, a well-defined naming structure may help to facilitate efficient access and retrieval of stored data files. For example, by applying a well-defined naming structure to data files, the names of the stored data files may be sufficiently meaningful or descriptive to allow a user to understand the content contained within the data files and/or the intended uses of the data files without needing to open the files and review their contents. In practice, when searching for certain information among a collection of data files, rather than opening each data file in the collection of data files, users may instead scan the names of stored data files in an attempt to identify data files that may contain that information. Having sufficiently descriptive or meaningful names for data files may help the user to efficiently find the relevant data files as well as understand the intended uses of the data files.

For a given construction project, it may also be desirable for an organization to apply different naming structures to different data files when naming such data files prior to placing them into a CDE. For instance, before placing data files into a CDE and thereafter disseminating them to individuals involved in the construction project, it may be desirable to assign names to data files related to data files used by one or more parties to build from (e.g., data files related to design of a building) that are based on a first naming structure, whereas it may be desirable to assign names to data files related to progress of an aspect of the project (e.g., a photograph showing progress of construction of a building) based on a second naming structure.

However, in order to have the ability to use different naming structures for different data files associated with a construction project, a given user (or perhaps multiple users) will generally need to carry out the following tasks for each respective data file before the respective data file can be made available to other individuals involved in the construction project: (i) evaluate the respective data file in order to determine the particular naming structure that should be used for naming the data file, (ii) evaluate the respective data file in order to come up with a particular name for the data file that complies with the particular naming structure, and (iii) input the particular name for the respective data file in some manner, which may depend on whether the given user is carrying out these tasks before or after the respective data file is uploaded to a software application that employs a CDE-type approach. For instance, if the given user carries out these tasks before the respective data file is uploaded to such a software application, inputting the particular name for the respective data file may involve overwriting the name of the native data file prior to uploading (e.g., using the file system of the given user's computer), whereas if the given user carries out these tasks after the respective data file is uploaded to such a software application, inputting the particular name for the respective data file may involve entering the new name of the data file into the software application. Other examples are possible as well.

However, as the number of data files associated with a construction project increases, requiring a user to carry out these tasks of determining the appropriate naming structure, coming up with an appropriate name based on the naming structure, and then inputting the appropriate name for each respective data file on a file-by-file basis (which may referred to herein as a "user-driven, file-based approach") becomes a cumbersome, labor intensive, and time-consuming process. Additionally, this user-driven, file-based approach for assigning naming-structure-based names to data files may be prone to user error, such as a user using an inappropriate naming structure for a data file, failing to create an appropriate name for the data file based on the selected naming structure (e.g., by populating one or more data fields of the naming structure with incorrect information), and/or mis-entering the name that is determined for the data file, which may lead to a misunderstanding and/or error when exchanging the data file among teams and individuals. In this respect, entering an inappropriate name for a data file may also, in some examples, result in a failure to comply with a standard (e.g., ISO 19650) that is being used to govern the construction project. The user-driven, file-based approach for assigning naming-structure-based names to data files may give rise to other problems as well.

In an effort to alleviate some of these problems, a software application could employ a modified user-driven approach whereby users have the ability to associate preassigned naming structures to certain folders within a folder structure for storing data files, and then the software application determines the appropriate naming structures for data files based on the folders in which the data files are placed. For instance, when a user places a data file into a given folder that has been associated with a preassigned naming structure, such a software application may rely on the user's pre-assignment of the naming structure as a basis for determining the appropriate naming structure to use for the data file, and may then prompt the user to create a name for the data file based on the preassigned naming structure.

However, this modified user-driven approach for assigning naming-structure-based names to data files (also referred to herein as a "user-driven, folder-based approach") also gives rise to various problems. As one example, this user-driven, folder-based approach for assigning naming-structure-based names to data files still requires users to create the folder structure, preassign naming structures to the folders, place each uploaded data file into the appropriate folder, and create and input a name for each data file based on the preassigned naming structure of the folder in which the data file is placed, which is still a cumbersome, labor intensive, and time-consuming process, particularly in view of the large number of data files that are likely to be uploaded throughout the course of a construction project. As another example, this user-driven, folder-based approach for assigning naming-structure-based names to data files is still prone to user error. For instance, a user may assign an inappropriate naming structure to a folder or place a data file in an incorrect folder, which may result in an inappropriate naming structure being selected for the data file, or as with the file-based approach, the user may also fail to create an appropriate name for the data file based on the selected naming structure by mis-entering the name that is determined for the data file. The user-driven, folder-based approach for assigning names to data files may give rise to other problems as well.

To help address the aforementioned and other problems, disclosed herein is new software technology for assigning naming-structure-based names to data files based on metadata (which may also be referred to as "attributes") associated with the data files. In practice, the disclosed software technology could be implemented in a software as a service ("SaaS") application for construction management, such as the SaaS application offered by Procore Technologies, Inc., but it should be understood that the disclosed technology for assigning naming-structure-based names to data files may be incorporated into various other types of software applications as well (including software applications for managing data files in industries other than construction).

In accordance with the disclosed technology, a computing platform is configured to receive a data file and obtain metadata associated with the data file. The computing platform may receive data files and obtain metadata associated with those data files in various ways. In some implementations, a user may upload data files (e.g., PDF files, JPEG files, DWG files, BIM files, CAD files, etc.) associated with a construction project through a client station running front-end software for a SaaS application, and this then results in the data files associated with the project being transmitted by the client station to a computing platform running back-end software for the SaaS application via the Internet and then being stored by the computing platform for future access. In addition to receiving data files, the computing platform may obtain metadata associated with received data files, which may generally comprise data that provides information about the data files. In practice, a data file may have any of various associated metadata fields, examples of which may include fields that respectively contain information such as original and/or current file name, file type (e.g., drawing, specification, model, photo, etc.), description, suitability status (e.g., S1 (suitable for coordination), S2 (suitable for information), S3 (suitable for review & comment), S4 (suitable for stage approval), etc.), trade (e.g., electrical, plumbing, etc.), stage (e.g., preconstruction, design, bidding, construction, closeout, maintenance, etc.), classification (e.g., sub-type of document, such as elevation drawing, plan view drawing, etc.), volume/system (e.g., building zone or building system of project, such as heating system or power system), location (e.g., building, level of building, etc.), originator (e.g., the individual or organization that uploaded the data file), original file format, file size, due date, revision, permissions, date created, date uploaded, storage zone (e.g., zone where the data is stored or to be stored), project (e.g., name of the construction project), file identifier (e.g., a unique number to identify a data file), time (e.g., amount of time the data file has been stored by the computing platform), and/or current assignee. Other metadata is possible as well.

Further, the universe of metadata fields for which metadata may be obtained for a given data file may depend on any of various factors, examples of which may include the nature of the data files being evaluated (e.g., data files within a SaaS application for construction management versus data files within some other type of software application), the preferences of the SaaS application provider, the preferences of the user, and/or other factors that are specific to the type of SaaS application that incorporates the disclosed technology (e.g., in a SaaS application for construction management, the universe of metadata fields could depend on the specific construction project to which the data files are associated and/or the particular type of construction-related data files that are being evaluated). Other examples are possible as well.

Further yet, the computing platform may obtain the metadata in various ways. As one possibility, a given user (e.g., the user that uploaded the data file and/or a user tasked with reviewing uploaded data files) may enter certain types of information about the data file via the user's client station, and this information may thereafter be sent from the client station to the computing platform in the form of metadata that is indicative of that information—which may then be received and stored by the computing platform. As another possibility, the computing platform may automatically generate certain types of metadata based on a data file that is received. For example, a native data file being uploaded may itself comprise one or more metadata fields that are associated with the native data file (e.g., metadata generated by the application that created the data file), in which case the computing platform may extract the native metadata for certain of these metadata fields and then store it as metadata for the data file that is accessible within the SaaS application. As another example, the computing platform may perform an analysis on a data file (e.g., analysis using natural language processing (NLP) or other machine learning-based techniques), and generate certain types of metadata based on that computing-platform analysis that is then stored for the data file. Other examples of obtaining metadata (e.g., user-input metadata values and/or metadata values generated by the platform) are possible as well.

The obtained metadata may then be used by the computing platform to drive functionality for assigning names to data files stored within the computing platform. For instance, after obtaining the metadata associated with a data file, the computing platform may be configured to (i) based on a first set of metadata from the obtained metadata associated with the data file, determine a naming structure (e.g., from a set of available naming structures) to use for the data file, (ii) based on the determined naming structure and a second set of metadata from the obtained metadata, generate a proposed name for the data file, and (iii) apply the proposed name (or a user-modified version thereof) to the data file.

In accordance with the present disclosure, the naming structure to use for naming the data file may be selected from some universe of predefined naming structures that are available for assignment to data files stored within the computing platform. Such naming structures may take any of various forms, and in at least some implementations, may be defined in accordance with a standard such as ISO 19650. In general, the naming structures may each define a particular sequence of data fields, perhaps along with one or more delimiters that may be positioned between pairs of data fields. Further, in practice, the particular universe of naming structures that are available for use when naming data files could be defined by the SaaS application provider, the users of the SaaS application, or some combination thereof. Further yet, the particular universe of naming structures that are available for use in naming the data files could vary based on factors such as the specific construction project to which the data files are associated, the particular type of construction-related data files that are being evaluated, the organization implementing the naming structures, and/or the country in which the organization is operating, among other possibilities.

To illustrate with an example, a computing platform that hosts a SaaS application for construction management may maintain a first naming structure for data files related to a given construction project, which may define a first particular sequence of data fields and delimiters that is to be used as the "default" naming structure for naming data files related to the given construction project in the event that no other naming structure is determined to be applicable. This first naming structure may take various forms, one example of which may be: [Project] [Delimiter] [Originator] [Delimiter] [Trade] [Delimiter] [File Identifier]. In such a naming structure, Project may be some identifier (e.g., alphanumeric, numeric, etc.) of the particular construction project to which the data file relates, Originator may be some identifier of the individual or organization that prepared the data file, Trade may be some identifier of the particular trade to which the data file relates, and File Identifier may be some identifier of the particular data file (which may be a unique number to distinguish the data from other data files). Further, each Delimiter could be a Hyphen (-), an Underscore (_), or a Point (.), among other possibilities.

Thus, one possible example of a file name defined in accordance with this first naming structure could be "PROJ1_ORG1_Trade1_1001," where "PROJ1" is an identifier of the project, "ORG1" is an identifier of the originator, "Trade1" is an identifier of the trade, and "1001" is a numeric identifier of the particular data file. Many other examples are possible as well.

In addition to this first naming structure, the computing platform may also maintain additional naming structures that are each applicable to a specific subset of data files related to the construction project. As one possibility, for data files of one or more particular types (such as a drawing and/or specification), the computing platform may have access to a second naming structure comprising a second particular sequence of data fields and delimiters that includes (i) the data fields and delimiters of the first naming structure that is to serve as the default along with (ii) one or more additional data fields and/or delimiters. This second naming structure may take various forms, one example of which may be: [Project] [Delimiter] [Originator] [Delimiter] [Volume] [Delimiter] [Location] [Delimiter] [Type] [Delimiter] [Trade] [Delimiter] [File Identifier]. In such a naming structure, Project may be some identifier (e.g., alphanumeric, numeric, etc.) of the particular construction project to which the data file relates, Originator may be some identifier of the individual or organization that prepared the data file, Volume may be some identifier of the building zone or building system of a project to which the data file relates, Location may be some identifier of the location (e.g., building, level of a building, etc.) associated with the data file, Type may be some identifier of the file type of the data file, Trade may be some identifier of the particular trade to which the data file relates, and File Identifier may be some identifier of the particular data file (which may be a unique number to distinguish the data from other data files). Further, as above, each Delimiter could be a Hyphen (-), an Underscore (_), or a Point (.), among other possibilities.

Thus, two possible examples of file names defined in accordance with this second naming structure could be (i) "PROJ1_ORG1_v3_03_DWG_Architect_1002," where "PROJ1" is an identifier of the project, "ORG1" is an identifier of the originator, "v3" is an identifier of the zone of the project to which the data file relates, "03" is an identifier of the location associated with the data file, "DWG" is an identifier specifying that this is a drawing type of data file, "Architect" is an identifier of the trade, and "1002" is the numeric identifier of the particular data file, and (ii) "PROJ1_ORG2_v3_01_SPEC_Architect_1003," where "PROJ1" is an identifier of the project, "ORG2" is an identifier of the originator, "v3" is an identifier of the zone of the project to which the data file relates, "01" is an identifier of the location associated with the data file, "SPEC" is an identifier specifying that this is a specification type of data file, "Architect" is an identifier of the trade, and "1003" is the numeric identifier of the particular data file. Many other examples are possible as well.

As another possibility, for data files of yet another particular type (such as a photograph), the computing platform may have access to a third naming structure comprising a third particular sequence of data fields and delimiters. This third naming structure may take various forms, one example of which may be: [Project] [Delimiter] [Location] [Delimiter] [Date Created]. In such a naming structure, Project may be some identifier (e.g., alphanumeric, numeric, etc.), Location may be some identifier of the location (e.g., building, level of a building, etc.) associated with the data file, and Date Created may be some identifier of the date the data file was created. Further, as above, each Delimiter could be a Hyphen (-), an Underscore (_), or a Point (.), among other possibilities.

Thus, one possible example of a file name defined in accordance with this third naming structure could be "PROJ1_03_20220101," where "PROJ1" is an identifier of the project, "03" is an identifier of the location associated with the data file, and "20220101" is a numeric identifier of the date the data file was created. Many other examples are possible as well.

Additional naming structures are possible as well. Numerous sets of data files may benefit from given naming structures. As mentioned above, the particular universe of naming structures that are available for use in naming the data files could vary based on various factors. Thus, for different construction projects, the number of naming structures in the particular universe of naming structures that are available for use in naming the data files may vary. In general, for a given construction project, the number of naming structures in the particular universe of naming structures that are available for use in naming the data files may be two or more naming structures. In one example, a given construction project may have a number of naming structures that falls within the range of two to ten. However, in other examples, more naming structures in the universe of naming structures are possible.

As noted above, a computing platform operating in accordance with the disclosed technology may determine which naming structure to use for naming a data file (e.g., from a set of available naming structures) based on a first set of metadata associated with the data file, which may comprise the data file's current metadata values for a first set of metadata fields. In this respect, the first set of metadata fields for which a data file's metadata values are analyzed to determine which naming structure to use for the data file may take any of various forms, examples of which may include a metadata field indicating the type of the data file, a metadata field indicating the originator of the data file, a metadata field indicating the trade to which the data file relates, and/or a metadata field indicating the location associated with the data file, among other possibilities.

Further, the computing platform may carry out the function of determining which naming structure to use for naming a data file based on the first set of metadata in various ways, and in at least some implementations, the computing platform may utilize one or more data analytics operations that serve to analyze the first set of metadata associated with the data file and then predict which available naming structure is most appropriate for the data file based on that analysis. Such a data analytics operation may take various forms. As one possibility, such a data analytics operation may be embodied in the form of a user-defined set of rules that is applied to a data file's metadata values for the first set of metadata fields to predict which available naming structure to use for the data file. As another possibility, such a data analytics operation may be embodied in the form of a data science model that is applied to a data file's metadata values for the first set of metadata for the data file in order to determine which available naming structure to use for the data file. The computing platform may determine the naming structure to use for the data file in other manners as well.

After determining which naming structure to use for the data file (e.g., from a set of available naming structures) based on the first set metadata associated with the data file, the computing platform may then generate a proposed name for the data file based on the determined naming structure and a second set of metadata associated with the data file, which may comprise the data file's current metadata values for a second set of metadata fields. In this respect, the second set of metadata that is utilized to generate the proposed name may be based on the data fields specified by the determined naming structure. The second set of metadata may be different than the first set of metadata that is analyzed to determine the naming structure for the data file (although the first and second sets of metadata could overlap at least in part). For instance, in line with the discussion above regarding the three example naming structures, the second set of metadata may comprise values for metadata fields such as project, originator, volume, location, file type, trade, file identifier, and/or date created, among other possibilities.

Further, the function of generating the proposed name for the data file based on the determined naming structure and the second set of metadata may take various forms, and in at least some implementations, this function may involve (i) identifying which data fields are specified by the determined naming structure, (ii) obtaining the data file's metadata values for the data fields specified by the determined naming structure, and then (iii) populating the data fields with the metadata values of the data file in order to generate the proposed name.

After generating the proposed name for the data file, the computing platform may then apply the proposed name (or a user-modified version thereof) to the data file. For instance, in some implementations, after generating the proposed name for the data file, the computing platform may then cause the proposed name to be presented to a user of the SaaS application in a manner that allows the user to either (i) confirm that the proposed name should be applied to the data file or (ii) modify the proposed name. In such implementations, the computing platform may function to transmit a communication identifying the proposed name to a client station associated with the user and thereby cause an indication of the proposed name for the data file to be presented at a user interface of the client station in a manner that enables the user to review the proposed name and then either confirm the proposed name or submit a modified version of the proposed name (e.g., by modifying the value of each of one or more data fields included within the proposed name and then submitting the modification(s) to the computing platform). In turn, the computing platform may then apply the confirmed name (i.e., the originally-proposed or user-modified name) to the data file, which may involve storing the confirmed name as a metadata value for the data file, among other possibilities.

In other implementations, after generating the proposed name for the data file, the computing platform may function to automatically apply the proposed name to the data file (e.g., by storing the proposed name as a metadata value for the data file). In such implementations of automatically applying the proposed name, the computing platform may function to transmit a communication identifying the automatically-applied proposed name to a client station associated with a user of the SaaS application and thereby cause an indication of the automatically-applied proposed name for the data file to be presented at a user interface of the client station so as to notify the user of which name has been assigned to the data file.

By determining the naming structure for a data file based on a first set of metadata from the obtained metadata associated with the data file and then generating a proposed name for the data file based on the determined naming structure and a second set of metadata from the obtained metadata associated with the data file, the computing platform helps to ensure that both an appropriate naming structure and an appropriate naming-structure-based name are used for the data file.

The software technology disclosed herein may provide various benefits over existing techniques for assigning names to data files. For instance, using a data-driven approach to recommend names for assignment to data files based on metadata associated with the data files may provide a more efficient and accurate assignment of names to data files than existing approaches for assigning names to data files, which as noted above are primarily user-driven.

For instance, as noted above, user-driven approaches may require users to expend a substantial amount of time and effort assigning names to data files. Advantageously, the disclosed data-driven approach for assigning names may help to significantly reduce this time and effort by leveraging a data file's metadata to both automatically select the appropriate naming structure for the data file and also automatically generate and populate a proposed name for the data file.

Moreover, as noted above, user-driven approaches are prone to user error. Advantageously, the disclosed data-driven approach for assigning names may help to significantly reduce this risk of user error by leveraging a data file's metadata to both automatically select the appropriate naming structure for the data file and also automatically generate and populate a proposed name for the data file, which leads to assignments of naming-structure-based names that are based at least in part of metadata for the data files rather than on user input alone. In this way, the disclosed data-driven approach may thus help to provide more accurate assignments of names to data files than user-driven approaches, which in turn may help to efficiently and effectively improve compliance with standards governing a construction project, such as ISO 19650, among other possibilities.

In accordance with the above, in one aspect, disclosed herein is a method that involves a computing platform: (i) receiving, from a first client station, a data file; (ii) obtaining metadata associated with the data file; (iii) determining, based on at least a first set of metadata from the obtained metadata associated with the data file, a naming structure to use for the data file; (iv) generating, based on the determined naming structure and at least a second set of metadata from the obtained metadata, a proposed name for the data file; and (v) transmitting, to a second client station, a communication identifying the proposed name and thereby causing an indication of the proposed name for the data file to be presented at a user interface of the second client station In another aspect, disclosed herein is a computing system that includes at least one processor, a non-transitory computer-readable medium, and program instructions stored on the non-transitory computer-readable medium that are executable by the at least one processor to cause the computing platform to carry out the functions disclosed herein, including but not limited to the functions of the foregoing method.

In yet another aspect, disclosed herein is a non-transitory computer-readable medium comprising program instructions that are executable to cause a computing platform to carry out the functions disclosed herein, including but not limited to the functions of the foregoing method.

One of ordinary skill in the art will appreciate these as well as numerous other aspects in reading the following disclosure.

BRIEF DESCRIPTION OF THE DRAWINGS

FIGS. 7a-b depict example snapshots of a GUI that may be presented to a user according to the disclosed technology.

DETAILED DESCRIPTION

The following disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners, each of which is contemplated herein.

As noted above, the present disclosure generally relates to technology for assigning naming-structure-based names to data files based on metadata associated with the data files. In practice, the disclosed technology may be incorporated into a software as a service ("SaaS") application that facilitates control and management of data files, which may include back-end software that runs on a back-end computing platform and front-end software that runs on users' client stations (e.g., in the form of a native application, a web application, and/or a hybrid application, etc.) and can be used to access the SaaS application via a data network, such as the Internet. For example, as one possible example, the disclosed technology may be incorporated into a SaaS application for construction management, such as the one offered by Procore Technologies, Inc. However, other examples are possible as well.

I. Example System Configuration

Figure 1:
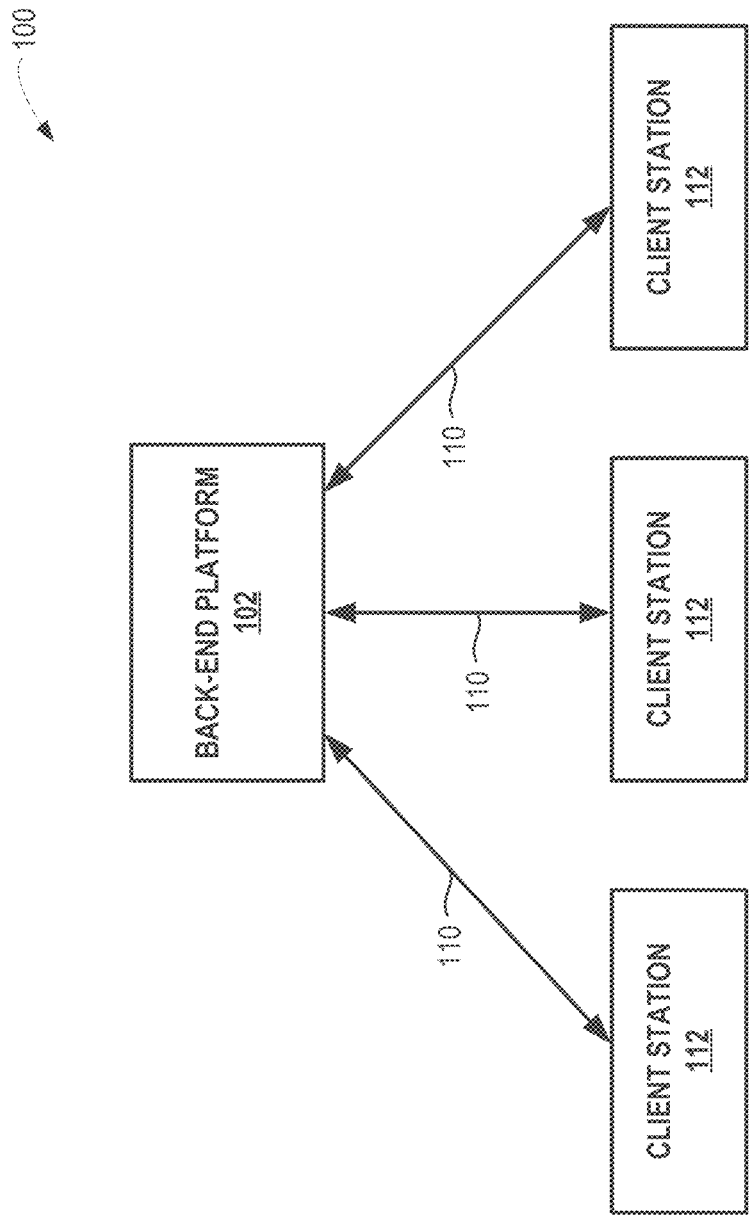
FIG. 1 depicts an example network configuration in which example embodiments may be implemented.

Turning now to the figures, FIG. 1 depicts an example network configuration 100 in which example embodiments of the present disclosure may be implemented. As shown in FIG. 1, network configuration 100 includes a back-end computing platform 102 that may be communicatively coupled to one or more client stations, depicted here, for the sake of discussion, as client stations 112.

Broadly speaking, back-end computing platform 102 may comprise one or more computing systems that have been installed with back-end software (e.g., program code) for hosting an example SaaS application that incorporates the disclosed technology and delivering it to users over a data network. The one or more computing systems of back-end computing platform 102 may take various forms and be arranged in various manners.

For instance, as one possibility, back-end computing platform 102 may comprise cloud computing resources that are supplied by a third-party provider of "on demand" cloud computing resources, such as Amazon Web Services (AWS), Amazon Lambda, Google Cloud Platform (GCP), Microsoft Azure, or the like, which may be provisioned with software for carrying out one or more of the functions disclosed herein. As another possibility, back-end computing platform 102 may comprise "on-premises" computing resources of the organization that operates the example computing platform 102 (e.g., organization-owned servers), which may be provisioned with software for carrying out one or more of the functions disclosed herein. As yet another possibility, the example computing platform 102 may comprise a combination of cloud computing resources and on-premises computing resources. Other implementations of back-end computing platform 102 are possible as well.

In turn, client stations 112 may each be any computing device that is capable of accessing the SaaS application hosted by back-end computing platform 102. In this respect, client stations 112 may each include hardware components such as a processor, data storage, a communication interface, and user-interface components (or interfaces for connecting thereto), among other possible hardware components, as well as software components that facilitate the client station's ability to access the SaaS application hosted by back-end computing platform 102 and run the front-end software of the SaaS application (e.g., operating system software, web browser software, mobile applications, etc.). As representative examples, client stations 112 may each take the form of a desktop computer, a laptop, a netbook, a tablet, a smartphone, and/or a personal digital assistant (PDA), among other possibilities.

As further depicted in FIG. 1, back-end computing platform 102 may be configured to interact with client stations 112 over respective communication paths 110. In this respect, each communication path 110 between back-end computing platform 102 and one of client stations 112 may generally comprise one or more communication networks and/or communications links, which may take any of various forms. For instance, each respective communication path 110 with back-end computing platform 102 may include any one or more of point-to-point links, Personal Area Networks (PANs), Local-Area Networks (LANs), Wide-Area Networks (WANs) such as the Internet or cellular networks, and/or cloud networks, among other possibilities. Further, the communication networks and/or links that make up each respective communication path 110 with back-end computing platform 102 may be wireless, wired, or some combination thereof, and may carry data according to any of various different communication protocols. Although not shown, the respective communication paths 110 between client stations 112 and back-end computing platform 102 may also include one or more intermediate systems. For example, it is possible that back-end computing platform 102 may communicate with a given client station 112 via one or more intermediary systems, such as a host server (not shown). Many other configurations are also possible.

While FIG. 1 shows an arrangement in which three client stations are communicatively coupled to back-end computing platform 102, it should be understood that this is merely for purposes of illustration and that any number of client stations may communicate with back-end computing platform 102.

Although not shown in FIG. 1, back-end computing platform 102 may also be configured to interact with other third-party computing platforms, such as third-party computing platforms operated by organizations that have subscribed to the SaaS application and/or third-party computing platforms operated by organizations that provide back-end computing platform 102 with third-party data for use in the SaaS application. Such computing platforms, and the interaction between back-end computing platform 102 and such computing platforms, may take various forms.

It should be understood that network configuration 100 is one example of a network configuration in which embodiments described herein may be implemented. Numerous other arrangements are possible and contemplated herein. For instance, other network configurations may include additional components not pictured and/or more or less of the pictured components.

II. Example Computing Platform

Figure 2:
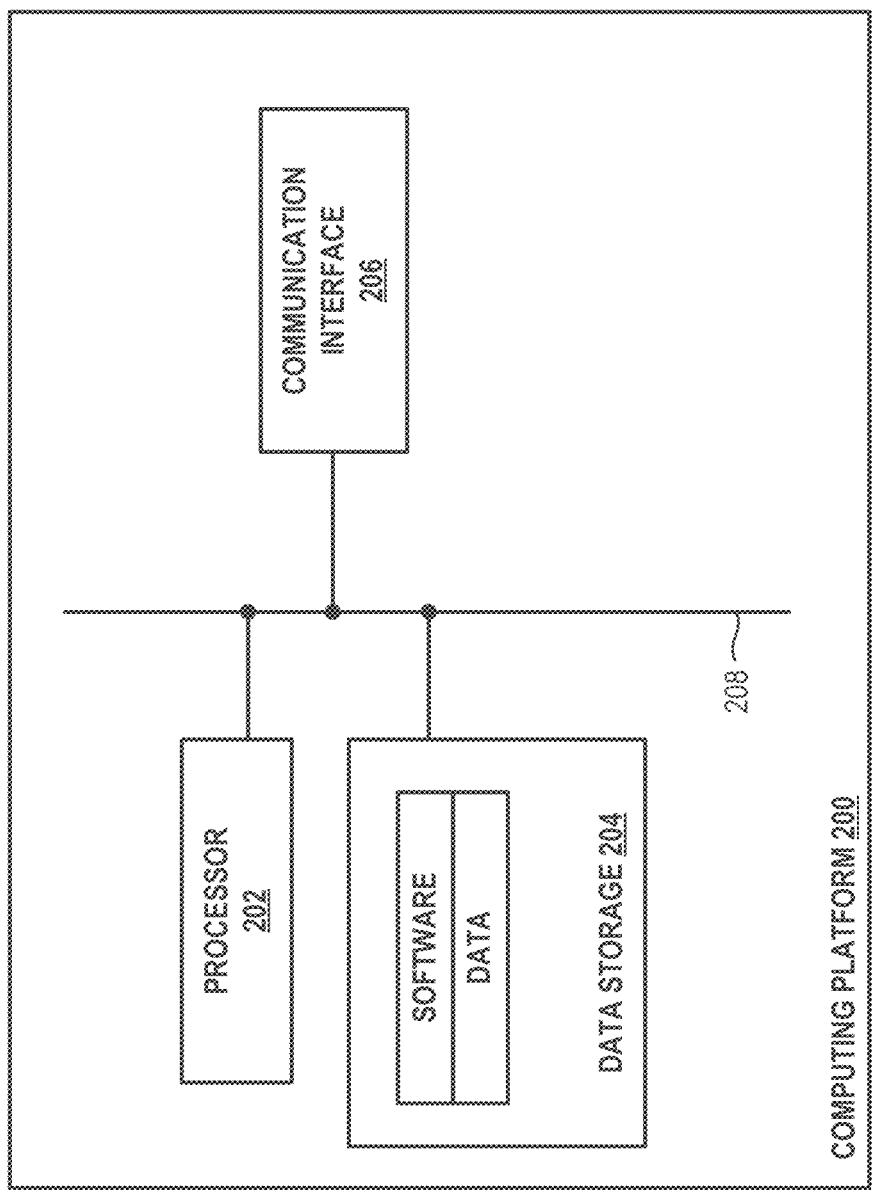
FIG. 2 depicts an example computing platform that may be configured to carry out one or more of the functions according to the disclosed technology.

FIG. 2 is a simplified block diagram illustrating some structural components that may be included in an example computing platform 200, which could serve as, for instance, back-end computing platform 102 of FIG. 1. In line with the discussion above, computing platform 200 may generally comprise one or more computer systems (e.g., one or more servers), and these one or more computer systems may collectively include at least a processor 202, data storage 204, and a communication interface 206, all of which may be communicatively linked by a communication link 208 that may take the form of a system bus, a communication network such as a public, private, or hybrid cloud, or some other connection mechanism.

Processor 202 may comprise one or more processing components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. In line with the discussion above, it should also be understood that processor 202 could comprise processing components that are distributed across a plurality of physical computing devices connected via a network, such as a computing cluster of a public, private, or hybrid cloud.

In turn, data storage 204 may comprise one or more non-transitory computer-readable storage mediums that are collectively configured to store (i) program instructions that are executable by processor 202 such that computing platform 200 is configured to perform some or all of the disclosed functions, which may be arranged together into engineering artifacts or the like, and (ii) data that may be received, derived, or otherwise stored by computing platform 200 in connection with the disclosed functions. In this respect, the one or more non-transitory computer-readable storage mediums of data storage 204 may take various forms, examples of which may include volatile storage mediums such as random-access memory, registers, cache, etc. and non-volatile storage mediums such as read-only memory, hard-disk drives, solid-state drives, flash memory, optical-storage devices, etc. Further, data storage 204 may utilize any of various types of data storage technologies to store data within the computing platform 200, examples of which may include relational databases, NoSQL databases (e.g., columnar databases, document databases, key-value databases, graph databases, etc.), file-based data stores (e.g., Hadoop Distributed File System or Amazon Elastic File System), object-based data stores (e.g., Amazon S3), data warehouses (which could be based on one or more of the foregoing types of data stores), data lakes (which could be based on one or more of the foregoing types of data stores), message queues, and/or streaming event queues, among other possibilities. Further yet, in line with the discussion above, it should also be understood that data storage 204 may comprise computer-readable storage mediums that are distributed across a plurality of physical computing devices connected via a network, such as a storage cluster of a public, private, or hybrid cloud. Data storage 204 may take other forms and/or store data in other manners as well.

Communication interface 206 may be configured to facilitate wireless and/or wired communication with client stations (e.g., one or more client stations 112 of FIG. 1) and/or third-party computing platform. Additionally, in an implementation where computing platform 200 comprises a plurality of physical computing systems connected via a network, communication interface 206 may be configured to facilitate wireless and/or wired communication between these physical computing systems (e.g., between computing and storage clusters in a cloud network). As such, communication interface 206 may take any suitable form for carrying out these functions, examples of which may include an Ethernet interface, a serial bus interface (e.g., Firewire, USB 2.0, etc.), a chipset and antenna adapted to facilitate any of various types of wireless communication (e.g., WiFi communication, cellular communication, etc.), and/or any other interface that provides for wireless and/or wired communication. Communication interface 206 may also include multiple communication interfaces of different types. Other configurations are possible as well.

Although not shown, computing platform 200 may additionally include or have an interface for connecting to user-interface components that facilitate user interaction with computing system 200, such as a keyboard, a mouse, a trackpad, a display screen, a touch-sensitive interface, a stylus, a virtual-reality headset, and/or speakers, among other possibilities.

It should be understood that computing platform 200 is one example of a computing system that may be used with the embodiments described herein. Numerous other arrangements are possible and contemplated herein. For instance, other computing systems may include additional components not pictured and/or more or fewer of the pictured components.

III. Example Operations

As mentioned above, the present disclosure generally relates to technology for assigning naming-structure-based names to data files based on metadata associated with the data files. As further mentioned above, the assignment of naming-structure-based names to data files described herein can be carried out by a back-end computing platform, such as back-end computing platform 102 of FIG. 1, that is hosting a SaaS application comprising front-end software running on users' client stations and back-end software running on the back-end computing platform that is accessible to the client stations via a data network, such as the Internet. For instance, the disclosed technology is described below in the context of a SaaS application for construction management, such as the SaaS application offered by Procore Technologies, Inc., but it should be understood that the disclosed technology may be utilized to control and manage data files in various other contexts as well.

i. Obtaining and Storing Metadata for Data Files

In accordance with the disclosed technology, back-end computing platform 102 may be configured to receive data files, obtain metadata associated with such data files, and then store the obtained metadata for use in carrying out various functionality.

Back-end computing platform 102 may receive a data file from a client station in any suitable way. As one example, a user may upload a data file about a construction project through a client station running front-end software for a SaaS application. For instance, with reference to FIG. 1, a user of one of client stations 112 may upload the data file (perhaps along with other data files as well), and back-end computing platform 102 may then receive the uploaded data file (perhaps along with the other uploaded data files) from client station 112 over a data network such as the Internet.

As another example, a SaaS application may be configured such that a user may upload one or more data files by sending an email. For instance, a user of one of client stations 112 may send an email addressed to a platform administrator's email address, and the user may attach the one or more data files that the user wishes to upload. Back-end computing platform 102 may be configured to access the email having the attachments, so as to receive the one or more data files.

In yet another example, a SaaS application may be configured such that a user of one of client stations 112 may save one or more data files to a shared data store to which both client station 112 and back-end computing platform 102 have access. In turn, back-end computing platform 102 may retrieve files from the shared data store, and as such, saving the one or more data files on the shared drive may result in the one or more data files being received by back-end computing platform 102. Other examples of receiving the data files are possible as well.

Further, in general, any data files relevant to the construction project may be received by back-end computing platform 102 running the SaaS application for construction management. Example data files could include PDF files, JPEG files, DWG files, Building Information Model (BIM) files, and Computer-Aided Design (CAD) files (e.g., NWF files), among other possibilities.

After receiving data files in any of the manners described above, back-end computing platform 102 may store the data files for future access.

In addition to receiving data files, back-end computing platform 102 may also obtain metadata associated with received data files, which may generally comprise data that provides information about the data files. In practice, a data file may have metadata for any of various associated metadata fields, examples of which may include metadata fields that respectively contain information such as original and/or current file name, file type (e.g., drawing, specification, model, photo, etc.), description, suitability status (e.g., S1 (suitable for coordination), S2 (suitable for information), S3 (suitable for review & comment), S4 (suitable for stage approval), etc.), trade (e.g., electrical, plumbing, etc.), stage (e.g., preconstruction, design, bidding, construction, close-out, maintenance, etc.), classification (e.g., sub-type of document, such as elevation drawing, plan view drawing, etc.), volume/system (e.g., building zone or building system of project, such as heating system or power system), location (e.g., building, level of building, etc.), originator (e.g., the individual or organization that uploaded the data file), original file format, file size, due date, revision, permissions, date created, date uploaded, storage zone (e.g., zone where the data is stored or to be stored), project (e.g., name of the construction project), file identifier (e.g., a unique number to identify a data file), time (e.g., amount of time the data file has been stored by the computing platform), and/or current assignee. Other metadata is possible as well. Further, in at least some implementations, the particular metadata obtained for a given data file may depend on the particular construction project to which the data file is associated.

Further, the universe of metadata fields for which metadata may be obtained for a given data file may depend on any of various factors, examples of which may include the nature of the data files being evaluated (e.g., data files within a SaaS application for construction management versus data files within some other type of software application), the preferences of the SaaS application provider, the preferences of the user, and/or other factors that are specific to the type of SaaS application that incorporates the disclosed technology (e.g., in a SaaS application for construction management, the universe of metadata fields could depend on the specific construction project to which the data files are associated and/or the particular type of construction-related data files that are being evaluated). Other examples are possible as well.

Further yet, back-end computing platform 102 may obtain the metadata for a data file in various ways. In general, the obtained metadata for a data file may include metadata that has been received from one or more client stations and/or metadata generated by back-end computing platform 102. Further, the metadata that has been received from one or more client stations and the metadata generated by back-end computing platform 102 may be obtained in any suitable way, examples of which are described below.

Turning first to metadata that has been received from one or more client stations, back-end computing platform 102 may obtain metadata from the client station that uploaded the data file and/or a different client station. As one example, when uploading a data file using a client station, a user may enter certain types of information about the data file, and this information may thereafter be sent from the client station to back-end computing platform 102 in the form of metadata that is indicative of that information—which may then be received and stored by back-end computing platform 102. As another example, after a data file is received from a first client station, a user of a second, different client station may enter certain types of information about the data file, and this information may thereafter be sent from the second client station to back-end computing platform 102 in the form of metadata that is indicative of that information—which may then be received and stored by back-end computing platform 102. Other examples of obtaining metadata that has been received from one or more client stations are possible as well.

Turning next to metadata generated by back-end computing platform 102, the back-end computing platform may obtain such metadata. As one possibility, back-end computing platform 102 may automatically generate certain types of metadata based on the data file that is received. For example, a native data file being uploaded may itself comprise one or more metadata fields that are associated with the native data file (e.g., metadata generated by the application that created the data file and/or metadata generated and attached to the data file by an external application utilizing the data file), in which case back-end computing platform 102 may extract the native metadata for certain of these metadata fields and then store it as metadata for the data file that is accessible within the SaaS application. As another example, back-end computing platform 102 may perform an analysis on the data file (e.g., analysis using natural language processing (NLP) or other machine learning-based techniques), and generate certain types of metadata based on the computing-platform analysis that is then stored for the data file. Other examples of obtaining metadata (e.g., user-input metadata values and/or metadata values generated by platform) are possible as well.

After obtaining the metadata for a data file in any of the manners described above, back-end computing platform 102 may store the obtained metadata for future access. The obtained metadata may then be used by back-end computing platform 102 to drive various functionality for controlling and managing data files stored within back-end computing platform 102, as described in further detail below.

ii. Assignment of Naming-Structure-Based Names to Data Files

As noted above, the disclosed technology facilitates assignment of naming-structure-based names to data files based on obtained metadata associated with the data files, which may help to facilitate compliance with standards governing construction projects (e.g., ISO 19650).

Figure 3:
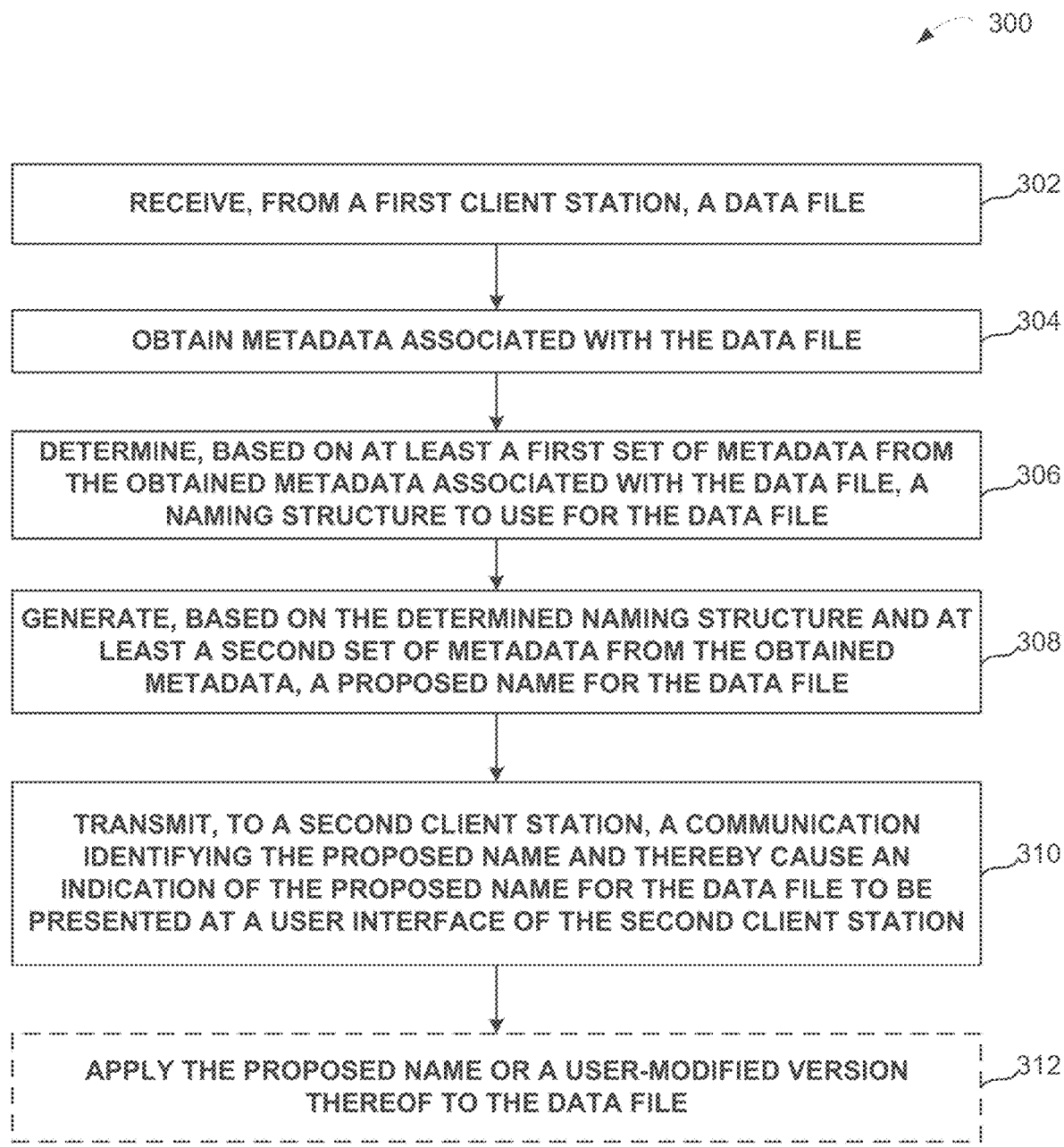
FIG. 3 depicts an example process for facilitating naming-structure-based assignment of names to data files according to the disclosed technology.

FIG. 3 depicts one example of a process 300 that may be carried out in accordance with the disclosed technology in order to facilitate metadata-based assignment of naming-structure-based names to data files. For purposes of illustration only, example process 300 is described as being carried out by back-end computing platform 102 of FIG. 1, but it should be understood that example process 300 may be carried out by computing platforms that take other forms as well. Further, it should be understood that, in practice, the functions described with reference to FIG. 3 may be encoded in the form of program instructions that are executable by one or more processors of back-end computing platform 102. Further yet, it should be understood that the disclosed process is merely described in this manner for the sake of clarity and explanation and that the example embodiment may be implemented in various other manners, including the possibility that functions may be added, removed, rearranged into different orders, combined into fewer blocks, and/or separated into additional blocks depending upon the particular embodiment.

The example process 300 may begin at block 302, where back-end computing platform 102 receives, from a first client station, a data file. In this respect, the data file may take any of various forms, including but not limited to the forms described above, and back-end computing platform 102 may receive the data file from the first client station in any suitable way, including but not limited to any of the ways of receiving a data file described above.

In practice, the data file that is received from the first client station may be stored in a data store, and back-end computing platform 102 may access that data store as needed.

In addition to receiving the data file, at block 304, back-end computing platform 102 obtains metadata associated with the data file. In this respect, the obtained metadata associated with the data file may take any of various forms, including but not limited to the forms described above, and back-end computing platform 102 may obtain such metadata in any suitable way, including but not limited to any of the ways of obtaining metadata for a data file described above.

After obtaining the metadata, at block 306, back-end computing platform 102 determines, based on at least a first set of metadata from the obtained metadata associated with the data file, a naming structure to use for the data file. In accordance with the present disclosure, the naming structure to use for naming the data file may be selected from some universe of predefined naming structures that are available for assignment to data files stored within back-end computing platform 102. Such naming structures may take any of various forms. In at least some implementations, the naming structures may be defined by the organization managing the construction project and/or defined in accordance with a standard such as ISO 19650. In general, the naming structures may each define a particular sequence of data fields and delimiters. Further, in practice, the particular universe of naming structures that are available for use when naming data files could be defined by the SaaS application provider, the users of the SaaS application, or some combination thereof. Further yet, the particular universe of naming structures that are available for use in naming the data files could vary based on factors such as the specific construction project to which the data files are associated, the particular type of construction-related data files that are being evaluated, the organization implementing the naming structures, and/or the country in which the organization is operating, among other possibilities.

The universe of naming structures may include any suitable naming structures. To illustrate with an example, for a given construction project, it may be desirable to provide different naming structures for data files of one or more particular types (e.g., drawings, specifications, photographs, and/or safety-protocol data files) and/or data files originated by different originators. As one possibility of a universe of naming structures for such a construction project, the universe of naming structures that available for use in naming the data files may include the following five example naming structures.

A first naming structure within the universe of naming structures may take the form of: [Project] [Delimiter] [Originator] [Delimiter] [Trade] [Delimiter] [File Identifier]. In such a naming structure, Project may be some identifier (e.g., alphanumeric, numeric, etc.) of the particular construction project to which the data file relates, Originator may be some identifier of the individual or organization that prepared the data file, Trade may be some identifier of the particular trade to which the data file relates, and File Identifier may be some identifier of the particular data file (which may be a unique number to distinguish the data from other data files). Further, each Delimiter could be a Hyphen (-), an Underscore (_), or a Point (.), among other possibilities. In an example, the first naming structure may be used as the "default" naming structure for naming data files related to the given construction project in the event that no other naming structure of the universe of naming structure is determined to be applicable.

A second naming structure within the universe of naming structures may take the form of: [Project] [Delimiter] [Originator] [Delimiter] [Volume] [Delimiter] [Location] [Delimiter] [Type] [Delimiter] [Trade] [Delimiter] [File Identifier]. In such a naming structure, Project may be some identifier (e.g., alphanumeric, numeric, etc.) of the particular construction project to which the data file relates, Originator may be some identifier of the individual or organization that prepared the data file, Volume may be some identifier of the building zone or building system of a project to which the data file relates, Location may be some identifier of the location (e.g., building, level of a building, etc.) associated with the data file, Type may be some identifier of the file type of the data file, Trade may be some identifier of the particular trade to which the data file relates, and File Identifier may be some identifier of the particular data file (which may be a unique number to distinguish the data from other data files). Further, as above, each Delimiter could be a Hyphen (-), an Underscore (_), or a Point (.), among other possibilities. In an example, the second naming structure may be intended for use with data files of one or more particular types (such as a drawing and/or specification).

A third naming structure within the universe of naming structures may take the form of: [Project] [Delimiter] [Originator] [Delimiter] [Volume] [Delimiter] [Location] [Delimiter] [Type] [Delimiter] [Classification] [Delimiter] [Trade] [Delimiter] [File Identifier]. In such a naming structure, Project may be some identifier (e.g., alphanumeric, numeric, etc.) of the particular construction project to which the data file relates, Originator may be some identifier of the individual or organization that prepared the data file, Volume may be some identifier of the building zone or building system of a project to which the data file relates, Location may be some identifier of the location (e.g., building, level of a building, etc.) associated with the data file, Type may be some identifier of the file type of the data file, Classification may be some identifier of a sub-type of the data file, Trade may be some identifier of the particular trade to which the data file relates, and File Identifier may be some identifier of the particular data file (which may be a unique number to distinguish the data from other data files). Further, as above, each Delimiter could be a Hyphen (-), an Underscore (_), or a Point (.), among other possibilities.

In an example, the third naming structure may be intended for use with data files that are one or more particular types and associated with one or more given originators. Such a type-and-originator-specific naming structure may be useful for particular originators associated with a construction project. As an example, a first company (e.g., a company dealing with concrete) may deal with different rules and/or regulations than a second company (e.g., a company dealing with framing), and therefore it may be useful to have a type-and-originator-specific naming structure for particular types of data files for the first company, so as to comply with various regulations to which the first company is subject.

A fourth naming structure within the universe of naming structures may take the form of: [Project] [Delimiter] [Location] [Delimiter] [Date Created]. In such a naming structure, Project may be some identifier (e.g., alphanumeric, numeric, etc.) of the particular construction project to which the data file relates, Location may be some identifier of the location (e.g., building, level of a building, etc.) associated with the data file, and Date Created may be some identifier of the date the data file was created. Further, as above, each Delimiter could be a Hyphen (-), an Underscore (_), or a Point (.), among other possibilities. In an example, the fourth naming structure may be intended for use with photographs (e.g., progress photographs).

A fifth naming structure within the universe of naming structures may take the form of: [Type] [Delimiter] [Originator] [Delimiter] [Date Created]. In such a naming structure, Type may be some identifier of the file type of the data file, Originator may be some identifier of the individual or organization that prepared the data file, and Date Created may be some identifier of the date the data file was created. Further, as above, each Delimiter could be a Hyphen (-), an Underscore (_), or a Point (.), among other possibilities. In an example, the fifth naming structure may be intended for use with safety-protocol data files related to the construction project.

Many other examples of naming structures and universes of naming structures are possible as well. In an example, sets of data files that may each benefit from respective naming structure include data files related to training materials, data files related to particular locations, and/or data files related to particular trade-specific matters, among other possibilities. Further, in some examples, the universe of available naming structures may also include a user-defined naming structure that is to be applied to the data file at upload.

As mentioned above, back-end computing platform 102 determines a naming structure to use for the data file based on a first set of metadata. The particular set of metadata that is analyzed by back-end computing platform 102 to determine which naming structure to use for the data file may take any of various forms, examples of which may include a metadata field indicating the type of the data file, a metadata field indicating the originator of the data file, a metadata field indicating the trade to which the data file relates, and/or a metadata field indicating the location associated with the data file, among other possibilities. Many other examples are possible as well.

In the illustrative example discussed above where the universe of naming structures includes the five example naming structures, the first set of metadata may include metadata values for metadata fields of file type and originator. In other examples, the first set of metadata that serves as a basis for determining the appropriate naming structure for a data file may include metadata values for different metadata fields. Further, the first set of metadata that serves as a basis for determining the appropriate naming structure for a data file may include metadata values for fewer or more metadata fields.

Further, back-end computing platform 102 may carry out the function of determining which naming structure to use for naming a data file based on the first set of metadata in various ways, and in at least some implementations, the computing platform may utilize one or more data analytics operations that serve to analyze the first set of metadata associated with the data file and then predict which available naming structure is most appropriate for the data file based on that analysis. Such a data analytics operation may take various forms.

As one possibility, a data analytics operation carried out by back-end computing platform 102 to determine which naming structure to use may be embodied in the form of a user-defined set of rules that is applied to a data file's metadata values for the first set of metadata fields to determine which available naming structure to use for the data file. In general, any suitable rule(s) to determine which available naming structure to use for the data file may be utilized. Further, in practice, the user-defined rules that are used to determine which available naming structure to use for the data file could be defined by the SaaS application provider, the users of the SaaS application, or some combination thereof. Further yet, the user-defined rules that are used to determine which available naming structure to use for the data file could vary based factors such as the specific construction project to which the data files are associated, the particular type of construction-related data files that are being evaluated, and/or the particular organization for which the data files are being stored, among other possibilities.

As an illustrative example of a user-defined set of rules, in line with discussion above where the universe of naming structures includes the five example naming structures, an example set of user-defined rules may include the following six rules: (i) if file-type metadata≠identifier for "Drawing," "Specification," "Photo," or "Health and Safety," then use the first naming structure (Rule 1); (ii) if file-type metadata=identifier for "Drawing" or "Specification" AND originator metadata≠identifier for "Originator 2," then use the second naming structure (Rule 2); (iii) if file-type metadata="Specification" AND originator metadata=identifier for "Originator 2," then use the second naming structure (Rule 3); (iv) if file-type metadata=identifier for "Drawing" AND originator metadata=identifier for "Originator 2," then use the third naming structure (Rule 4); (v) if file-type metadata=identifier for "Photo," then use the fourth naming structure (Rule 5); and (vi) if file-type metadata=identifier for "Health and Safety," then use the fifth naming structure (Rule 6). Many other examples of user-defined sets of rules are possible as well.

As another possibility a data analytics operation carried out by back-end computing platform 102 to determine which naming structure to use may be embodied in the form of a data science model that is applied to a data file's metadata values for the first set of metadata for the data file in order to determine which available naming structure to use for the data file. For instance, such a data science mode may take the form of a machine learning model for predicting a naming structure of a data file (e.g., a classifier model), which may have been trained based on historical data regarding appropriate naming structures for data files using any one or more machine learning techniques now known or later developed, examples of which may include a neural network technique (which is sometimes referred to as "deep learning"), a regression technique, a k-Nearest Neighbor (kNN) technique, a decision —tree technique, a support vector machines (SVM) technique, a Bayesian technique, an ensemble technique, a clustering technique, an association-rule-learning technique, a dimensionality reduction technique, an optimization technique such as gradient descent, a regularization technique, and/or a reinforcement technique, among other possible types of machine learning techniques. The computing platform may determine the naming structure to use for the data file in other manners as well.

Returning to FIG. 3, at block 308, back-end computing platform 102 generates, based on the determined naming structure and at least a second set of metadata from the obtained metadata, a proposed name for the data file. In general, the second set of metadata may comprise values for metadata fields that correspond to data fields included within the determined naming structure, examples of which may include project, originator, volume, location, file type, trade, file identifier, and/or date created, among other possibilities.

In this respect, the second set of metadata that is utilized to generate the proposed name may be different that the first set of metadata that is analyzed to determine the naming structure for the data file (although the first and second sets of metadata could overlap at least in part).

For instance, in line with discussion above where the universe of naming structures includes the five example naming structures, for that example given construction project, the first set of metadata may include the data file's metadata values for the metadata fields of file type and originator, whereas the second set of metadata used to generate the name may depend on the data fields of the determined naming structure. For example, if the determined naming structure is the first naming structure, the second set of metadata may include the data file's metadata values for the metadata fields of project, originator, trade, and file identifier. If the determined naming structure is the second naming structure, the second set of metadata may include the data file's metadata values for the metadata fields of project, originator, volume, location, file type, trade, and file identifier. If the determined naming structure is the third naming structure, the second set of metadata may include the data file's metadata values for the metadata fields of project, originator, volume, location, file type, classification, trade, and file identifier. If the determined naming structure is the fourth naming structure, the second set of metadata may include the data file's metadata values for the metadata fields of project, location, and date created. If the determined naming structure is the fifth naming structure, the second set of metadata may include the data file's metadata values for the metadata fields of type, originator, and date created.

In addition to configuring rules for naming structures to be applied to data files, back-end computing platform 102 may also configure rules to dictate what metadata-field values are to be obtained when a data file is uploaded. Such rules may ensure that appropriate metadata is obtained for the uploaded data file, which may in turn help to generate an appropriate proposed name for the data file.

Further, the function of generating the proposed name for the data file based on the determined naming structure and the second set of metadata may take various forms, and in at least some implementations, this function may involve (i) identifying which data fields are specified by the determined naming structure, (ii) obtaining the data file's metadata values for the data fields specified by the determined naming structure, and then (iii) populating the data fields with the metadata values of the data file in order to generate the proposed name.

Figure 4:
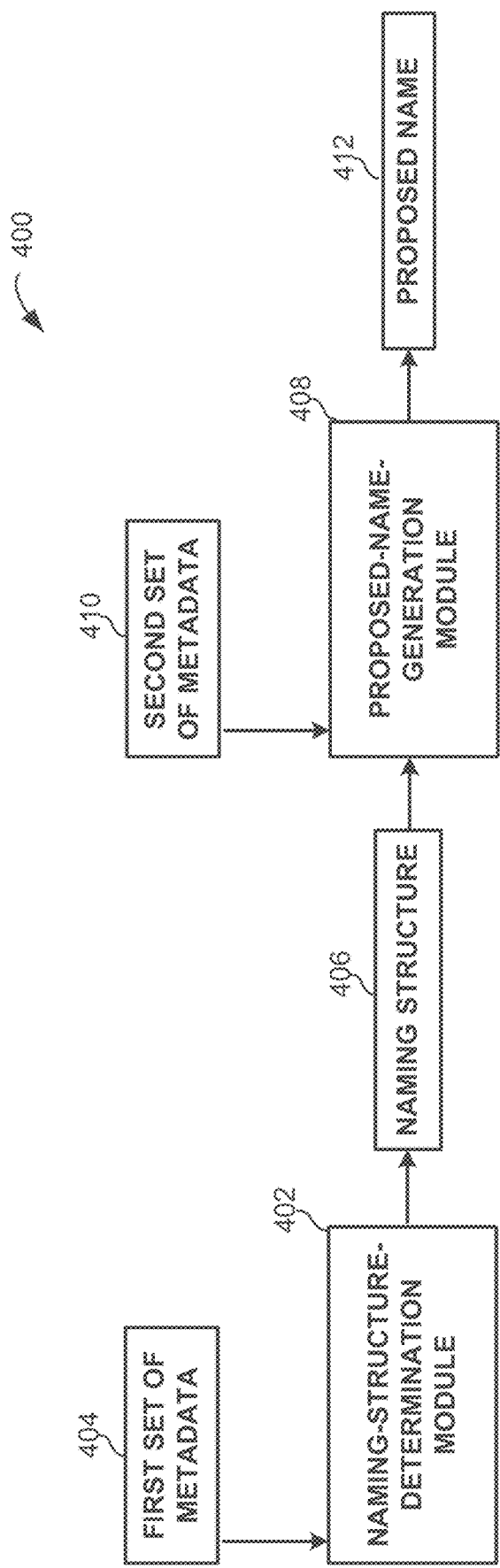
FIG. 4 depicts a conceptual illustration of an example data-analytics operation for determining a proposed name for a data file.

FIG. 4 depicts a conceptual illustration of an example data-analytics operation 400 for determining a proposed name for a data file. In the example of FIG. 4, naming-structure-determination module 402 may be configured to receive a first set of metadata 404 associated with a given data file. Naming-structure-determination module 402 is configured to evaluate first set of metadata 404 and, based on the evaluation, determine a naming structure 406 to use for the data file.

As an illustrative example, in line with discussion above where the universe of naming structures includes the five example naming structures, the first set of metadata may include a value of "SPEC" for the metadata field of file type and a value of "ORG2" for the metadata field of originator. Based on the user-defined set of rules, and in particular based on Rule 3, naming-structure-determination module 402 may determine second naming structure as the naming structure to use for the data file.

A proposed-name-generation module 408 may be configured to receive the naming structure 406. Proposed-name-generation module 408 may then (i) identify which data fields are specified by the determined naming structure, (ii) obtain a second set of metadata 410 that includes the data file's metadata values for the data fields specified by the determined naming structure 406, and (iii) populate the data fields with the metadata values of the data file in order to generate proposed name 412.

Continuing the example above, proposed-name-generation module 408 may identify the data fields of Project, Originator, Volume, Location, Type, Trade, and File Identifier as the data fields specified by the second naming structure. Proposed-name-generation module 408 may then obtain the data file's metadata values for the metadata fields of project, originator, volume, location, file type, trade, and file identifier, which may be "PROJ1," "ORG2," "v1," "01," "SPEC," "C," and "2001," respectively. Proposed-name-generation module 408 may then populate the data fields with those metadata values to generate proposed name 412 of "PROJ1_ORG2_v1_01_SPEC_C_2001."

As mentioned above, in some examples, the universe of available naming structures may include a user-defined naming structure that is to be applied to the data file at upload. In such an example, the metadata value for the original file name may be used as the second set of metadata, and the proposed name for the data file may be the original file name.

Returning to FIG. 3, at block 310, back-end computing platform 102 transmits, to a second client station, a communication identifying the proposed name and thereby causes an indication of the proposed name for the data file to be presented at a user interface of the second client station. In some examples, the first client station and the second client station are the same client station. Thus, the indication of the proposed name for the data file may be presented at the same client station from which the data file was received. On the other hand, in other examples, the first client station and the second client station are different client stations. As one possibility, the first client station and the second client station may be different client stations associated with the same user. For instance, the first client station may be a computer of the user, and the second client station may be a phone of the user. As another possibility, the first client station may be a client station of a first user, and the second client station may be a client station of a different, second user. For instance, the first client station may be a client station used by a user to email the data file to a platform administrator, and the second client station may be a client station of the platform administrator. Other examples are possible as well.

The indication presented at the user interface of the second client station may take various forms. In general, the indication may indicate to a user of the platform the populated values for the data fields of the naming structure. For instance, generating the proposed name for the data file may involve, for each data field, generating a proposed-name segment by populating the data field with a metadata value of the data file that is associated with the data field, and the indication of the proposed name may include the proposed-name segments.

Each of the proposed-name segments may be presented in an editable manner, such that, for each proposed-name segment, a user of the platform may, after reviewing the respective proposed-name segment, edit the proposed-name segment. if appropriate. A user of the platform may edit one or more of the proposed-name segments in any suitable way, examples of which include adjusting the value of the proposed-name segment via typing to overwrite the proposed-name segment or adjusting the value of the proposed-name segment via selection of another value from a drop-down menu, among other possibilities.

In some examples, if the user adjusts a metadata value for a metadata value that was in the first set of metadata (e.g., a metadata field for file type or originator), the computing platform may be configured to determine an updated naming structure for the data file based on the adjusted metadata value. The computing platform may then, based on the updated naming structure and a set of metadata associated with the updated naming structure, generate a second proposed name based on the updated naming structure. As one example, continuing the illustrative example discussed above, if a user adjusted the proposed-name segment for the Type data field from an identifier for drawing to an identifier for photograph, then computing platform may generate a new proposed name based on the fourth naming structure (which is different than the proposed name based on the second or third naming structure).

In example, data regarding user modifications to proposed names may be stored and then be used as input to a data analytics operation for automatically extracting metadata from data files and/or as input to a data analytics operation to determine an appropriate naming structure based on metadata. For instance, such data may be used as input to a machine learning model configured to automatically extract metadata from data files and/or determine an appropriate naming structure based on metadata. Such application of data related to user modifications of proposed names to such data analytics operations may help back-end computing platform 102 result in automatic generation of more appropriate metadata values for data files and/or improved determinations of naming structures to be applied to data files.

Returning to FIG. 3, at block 312, back-end computing platform 102 may apply the proposed name (or a user-modified version thereof) to the data file. In an example, the applying of the proposed name (or user-modified version thereof) may take place in response to a user inputting a request to apply the originally-proposed or user-modified name, which is relayed from the client station to back-end computing platform 102, and then back-end computing platform 102 applies the originally-proposed or user-modified name based on that communication from the client station. For instance, a user may activate a submit button, that activation is relayed from the client station to back-end computing platform 102, and then back-end computing platform 102 applies the confirmed name (i.e., the originally-proposed or user-modified name) to the data file.

In another example, back-end computing platform 102 may function to automatically apply the proposed name to the data file (e.g., by storing the proposed name as a metadata value for the data file). In such implementations of automatically applying the proposed name, the computing platform may function to transmit a communication identifying the automatically-applied proposed name to a client station associated with a user of the SaaS application and thereby cause an indication of the automatically-applied proposed name for the data file to be presented at a user interface of the client station so as to notify the user of which name has been assigned to the data file.

In an example, after applying the proposed name or the user-modified version of the proposed name to the data file, back-end computing platform 102 may place the data file in a common data environment (CDE). Placing the data file into the CDE may allow users with appropriate permissions within the CDE to access the document within the CDE.

Illustrative examples of how these various functions performed by back-end computing platform 102 may facilitate applying a naming-structure-based name to a data file will now be shown and described with respect to FIGS. 5a-7b, which comprise snapshots of GUI that may be presented by one or more given client stations 112.

Figure 5A:
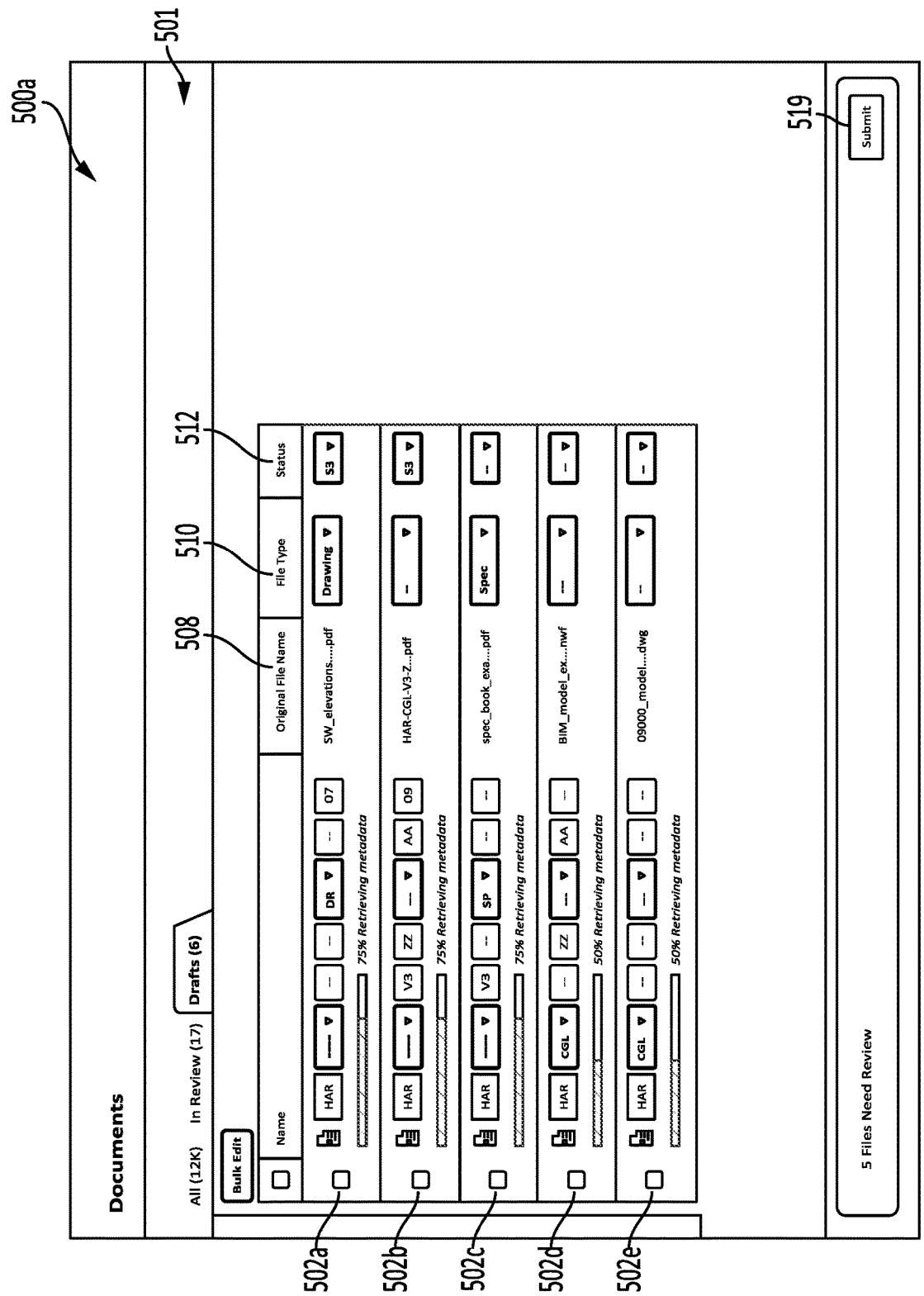
FIGS. 5a-b depict example snapshots of a graphical user interface (GUI) that may be presented to a user according to the disclosed technology.
Figure 5B:
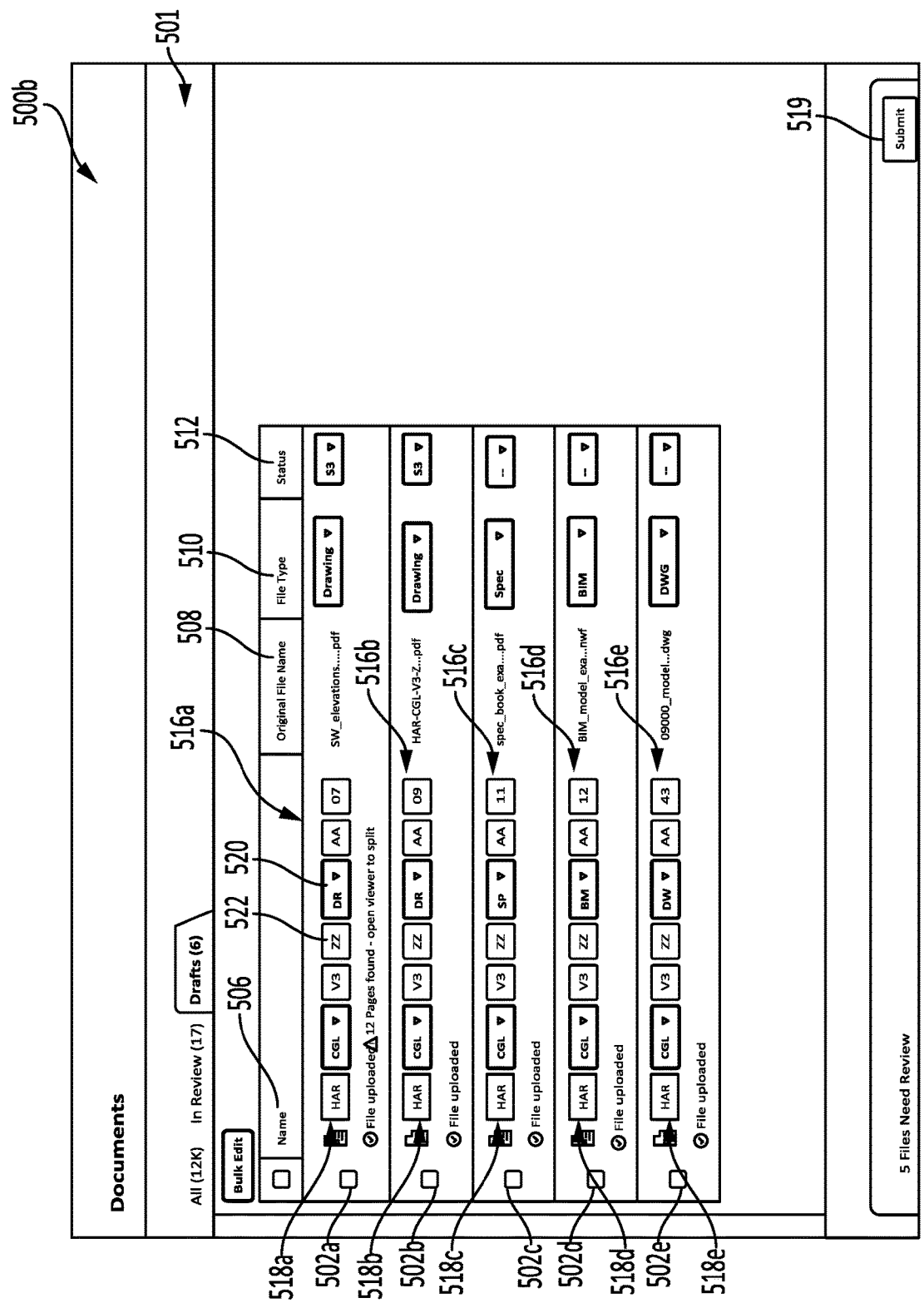

FIGS. 5a and 5b depict example snapshots 500a and 500b, respectively, of a GUI 501 that displays information during a process of a user uploading data files, back-end computing platform 102 obtaining metadata associated with the data files, and back-end computing platform 102 determining proposed names for the data files that are then presented to the user. In particular, snapshot 500a of FIG. 5a presents GUI 501 at a first instance or point in time (e.g., as data files are being uploaded and metadata is being generated by back-end computing platform 102). Further, snapshot 500b presents GUI 501 at a second point in time (e.g., after data files are uploaded) and through which a user can enter information or modify metadata associated with the data files, so as to facilitate back-end computing platform 102 receiving metadata from client station 112.

With reference to FIG. 5a, snapshot 500a is an example snapshot of the illustrated GUI 501 that may be presented to a user as data files 502a-e are being uploaded. As the data files are being uploaded, GUI 501 may display various metadata associated with the data files. For instance, metadata fields for original file name, file type, and status are displayed. In particular, GUI 501 includes an original file name column 508, a file type column 510, and a status column 512.

At the instance shown in FIG. 5a, GUI 501 is displaying metadata for original file name for data files 502a-e. Further, GUI 501 is displaying file-type metadata for data files 502a and 502c. Still further, the GUI 501 is displaying status metadata for data files 502a and 502b. In an example, this displayed metadata shown in GUI 501 corresponds to metadata generated by back-end computing platform 102. Further yet, in order to facilitate GUI 501 displaying this status metadata, back-end computing platform 102 may send one or more communications to client station 112 that cause indications of the generated metadata to be presented at GUI 501, as shown in FIG. 5a.

Turning to FIG. 5b, after data files 502a-e are uploaded, back-end computing platform 102 may obtain additional metadata. For instance, with reference to FIG. 5b, the file type metadata for data files 502b, 502d, and 502e is now displayed. In an example, this file-type metadata may have been generated by back-end computing platform 102 as the uploads of data files 502a-e were being completed. Alternatively, in another example, this file-type metadata may have been obtained by the user entering information about the file type via GUI 501, and this information may thereafter be sent from client station 112 to back-end computing platform 102 in the form of metadata that is indicative of that information—which may then be received and stored by back-end computing platform 102.

Further, as shown in FIG. 5b, the status metadata for data files 502c-e is blank. In an example, back-end computing platform 102 may have been unable to identity appropriate status information, and thus back-end computing platform 102 may have refrained from automatically generating status metadata for that field. In such a case, for each of these files, this user may enter status information via GUI 501, and this status information may thereafter be sent from client station 112 to back-end computing platform 102 in the form of status metadata that is indicative of that status information—which may then be received and stored by back-end computing platform 102.

It should be understood that, in addition to obtaining metadata that is displayed by GUI 501, back-end computing platform 102 may also obtain metadata that is not displayed by GUI 501. For instance, in addition to obtaining original-file-name metadata, file-type metadata, and status metadata, back-end computing platform 102 may obtain description metadata, version metadata, stage metadata, trade metadata, classification metadata, volume/system metadata, location metadata, originator metadata, format metadata, file-size metadata, due-date metadata, revisions metadata, file-identifier metadata, date-created metadata, date-uploaded metadata, storage-zone metadata, and/or permissions metadata, among other possibilities. Further, in practice, the metadata that is displayed by GUI 501 may be adjusted as desired. For instance, in an example, a user may select to have additional metadata columns displayed, such as trade, version, due date, and/or originator, among other possibilities.

As further shown in FIG. 5b, for each data file displayed, GUI 501 includes an indication of the proposed name for the data file in a name column 506. In particular, for data file 502a, GUI 501 includes an indication 516a of the proposed name for data file 502a, where the indication comprises a plurality of editable proposed-name segments 518a (where each proposed-name segment is associated with a given data field of the naming structure of the proposed name). Further, for data file 502b, GUI 501 includes an indication 516b of the proposed name for data file 502b, where the indication comprises a plurality of editable proposed-name segments 518b (where each proposed-name segment is associated with a given data field of the naming structure of the proposed name). Still further, for data file 502c, GUI 501 includes an indication 516c of the proposed name for data file 502c, where the indication comprises a plurality of editable proposed-name segments 518c (where each proposed-name segment is associated with a given data field of the naming structure of the proposed name). Yet still further, for data file 502d, GUI 501 includes an indication 516d of the proposed name for data file 502d, where the indication comprises a plurality of editable proposed-name segments 518d (where each proposed-name segment is associated with a given data field of the naming structure of the proposed name). And yet still further, for data file 502e, GUI 501 includes an indication 516e of proposed name for data file 502e, where the indication comprises a plurality of editable proposed-name segments 518e (where each proposed-name segment is associated with a given data field of the naming structure of the proposed name).

As one example of an editable proposed-name segment, for a given proposed-name segment, the GUI 501 may include a GUI element 520 (e.g., a button) that may be activated to reveal a drop-down menu, from which a user may select other values to adjust the value of the proposed-name segment. As another example of an editable proposed-name segment, for a given proposed-name segment, the GUI 501 may include a text box 522. A user may modify text within the text box 522 (e.g., by overwriting the text) to adjust the value of the proposed-name segment. Other example editable proposed-name segments are possible as well.

As one example of modifying a proposed name, for data file 502a, the user may modify the proposed name to reflect that the volume is volume 1 (i.e., "V1") rather than volume 3 (i.e., "V3"), and the computing platform may then apply the name of "HAR_CGL_V1_ZZ_DR_AA_07" to data file 502a after the user confirms that the user-modified version of the name should be applied (e.g., by activating the submit button 519). Further, in such an example, the computing platform may also responsively update the metadata of data file 502a to reflect that the volume is volume 1 (i.e., "V2") rather than volume 3 (i.e., "v3").

Figure 6:
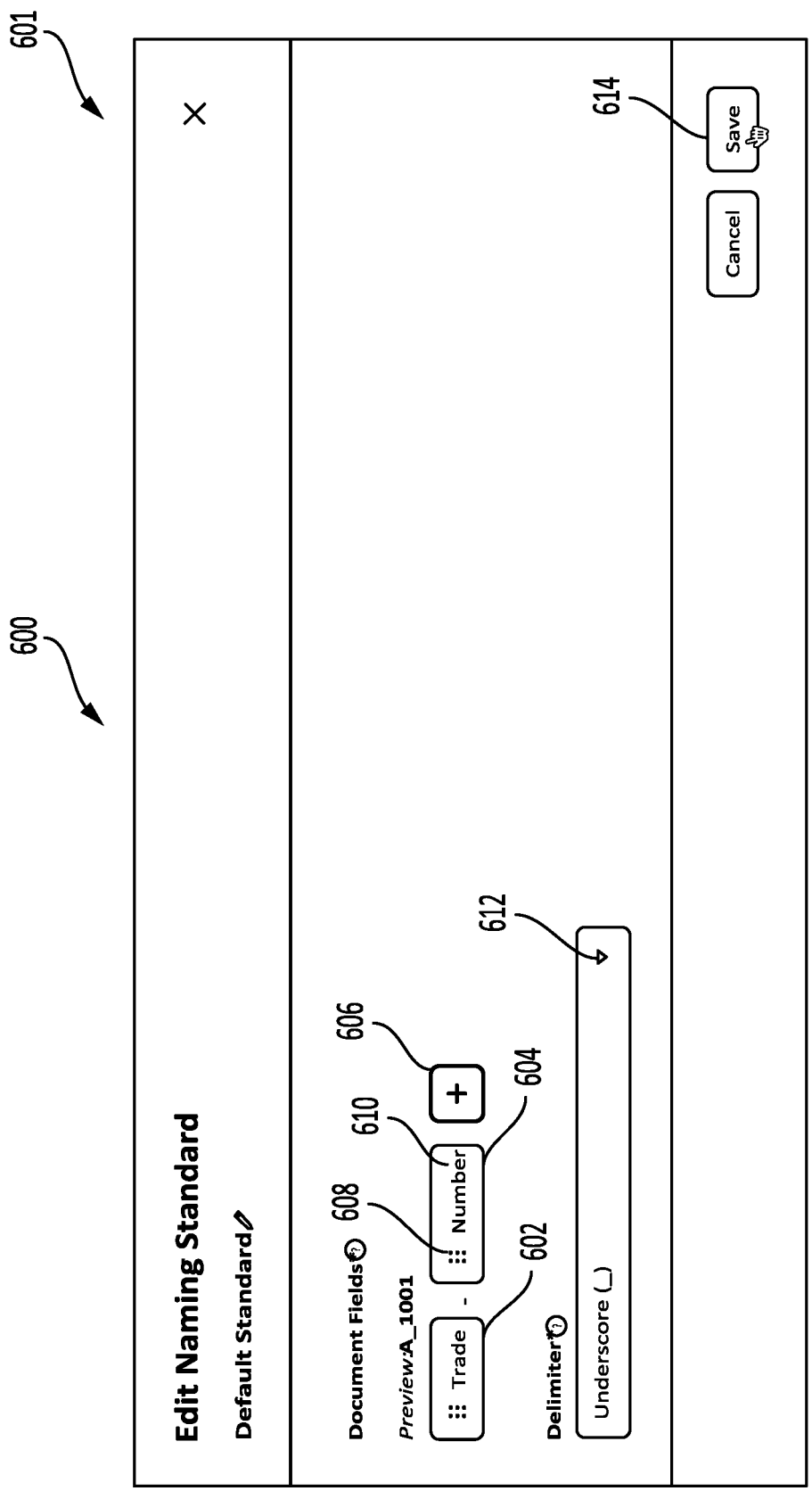
FIG. 6 depicts an example snapshot of a GUI that may be presented to a user according to the disclosed technology.
Figure 7A:
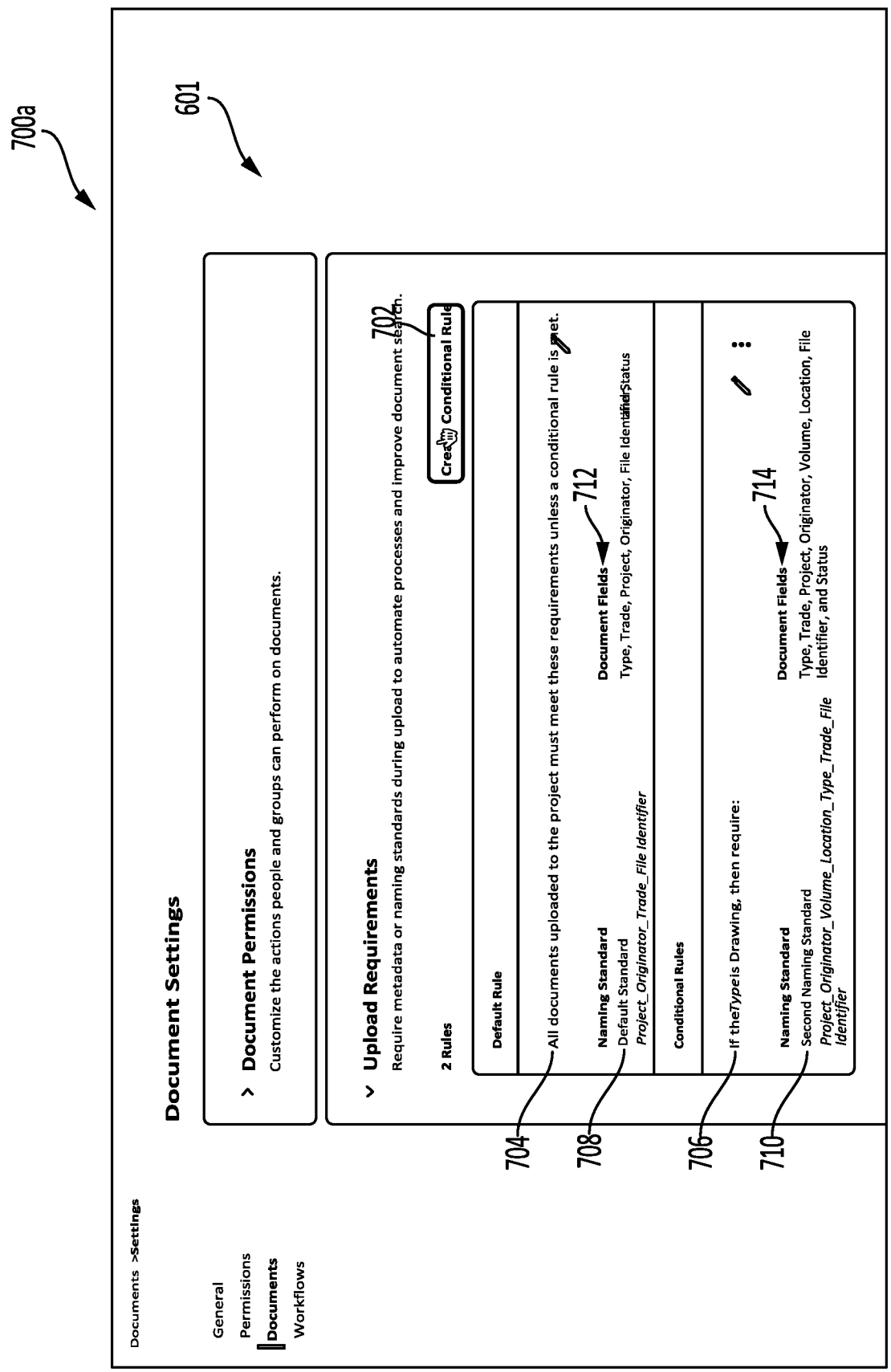

Back-end computing platform 102 may be configured to allow a user to define one or more naming structures available for assignment to data files and/or rules associated with the one or more naming structures. FIGS. 6, 7a, and 7b depict example snapshots 600, 700a, and 700b, respectively, of a GUI 601 that displays information during a process of a user defining one or more naming structures and defining one or more rules that are used to determine which available naming structures to use for data files In particular, FIG. 6, depicts an example snapshot 600 of a GUI 601 that displays information during a process of a user defining a naming structure. In order to define a naming structure, a user may activate button 606 to add one or more data fields to be included within the naming structure. In the example of FIG. 6, data fields 602 and 604 have been added, and the user may activate button 606 to add one or more data fields to be included within the naming structure. Further, for each added field, there may be an associated GUI element 608 that allows the user to adjust the metadata field 610 included within the added field. Such a GUI element 608 may allow a user to change order of the added data fields as desired. GUI 601 may also include a GUI element 612 that allows a user to select the delimiter to be used between respective data fields of the defined naming structure. After defining the naming structure, the user may activate button 614 to save the defined naming structure. The user may also create one or more additional naming structures, so as to define the universe of naming structures available for assignment to data files.

Further, FIGS. 7A-B depict example snapshots 700a and 700b, respectively, of GUI 601 that displays information during a process of a user defining one or more rules that are used to determine which available naming structures to use for data files.

With respect to FIG. 7a, snapshot 700a is an example snapshot of the GUI 601 that displays a default rule 704 and a conditional rule 706 that are used to determine which available naming structures to use for data files. Default rule 704 specifies that all data files uploaded to the project must meet the default naming structure 708 unless a conditional rule is met. Further, conditional rule 706 specifies that if the metadata field of file type is an identifier for "Drawing", then second naming structure 710 is applied.

Further, in addition to rules specifying naming structures to be applied to the data files, the rules may also specify what metadata fields are required to be populated at time of upload. For instance, default rule 704 specifies that metadata fields 712 should be populated at the time of upload, and conditional rule 706 specifies that metadata fields 714 should be populated at the time of upload. As discussed above, the obtained metadata values may be user-input metadata values and/or metadata values generated by the platform.

Although snapshot 700a shows two rules, one or more additional rules may be created by the user. To facilitate defining one or more additional rules, a user may activate button 702 to create one or more additional rules. FIG. 7B is an example snapshot of the GUI 601 that displayed information for defining a rule and through which a user can enter information, so as to facilitate defining a conditional rule. In an example, the user may select, via GUI element 722, one or more file types. The user may then select, via GUI element 724, a naming structure to apply to data files of the selected file type(s). Upon activation of GUI element 724, GUI 601 may display each naming structure in the universe of available naming structures, so as to allow a user to select a given naming structure. The user may also select, via GUI element 726, metadata fields that should be populated at the time of upload for data files of the selected file type(s). In an example, in addition or alternative to defining a rule based on file type, the defined rule may be based on other metadata fields, including, for instance, originator, location, and trade, among other possibilities.

In an example, GUI 501 of FIGS. 5a-b and GUI 601 of FIGS. 6-7b are user interfaces of different client stations. For instance, GUI 501 may be a user interface of a client station associated with a user that is uploading one or more documents, and GUI 601 may be a user interface of a client station associated with a document controller that is defining naming structures and/or rules associated with the naming structures.

IV. Conclusion

Example embodiments of the disclosed innovations have been described above. Those skilled in the art will understand, however, that changes and modifications may be made to the embodiments described without departing from the true scope and spirit of the present invention, which will be defined by the claims.

For instance, those in the art will understand that the disclosed operations for assigning naming-structure-based names to data files based on metadata associated with the data files may not be limited to only construction projects. Rather, the disclosed operations could be used in other contexts in connection with other types of projects as well.

Further, to the extent that examples described herein involve operations performed or initiated by actors, such as "humans," "operators," "users," or other entities, this is for purposes of example and explanation only. The claims should not be construed as requiring action by such actors unless explicitly recited in the claim language.

The invention claimed is:

1. A computing platform comprising:
a network interface;
at least one processor;
a non-transitory computer-readable medium; and
program instructions stored on the non-transitory computer-readable medium that are executable by the at least one processor to cause the computing platform to:
receive, from a first client station, a data file;
obtain metadata associated with the data file;
determine, based on at least a first set of metadata from the obtained metadata associated with the data file, a naming structure to use for the data file, wherein the first set of metadata comprises metadata values for metadata fields, and wherein the determined naming structure (i) is selected from a plurality of predefined naming structures that each defines a respective sequence of data fields, and (ii) includes one or more data fields, each data field corresponding to a respective metadata value of the first set of metadata;
generate, based on the determined naming structure and at least a second set of metadata from the obtained metadata, a proposed name for the data file; and
transmit, to a second client station, a communication identifying the proposed name and thereby cause an indication of the proposed name for the data file to be presented at a user interface of the second client station.

2. The computing platform of claim 1, further comprising program instructions stored on the non-transitory computer-readable medium that are executable by the at least one processor to cause the computing platform to:
apply the proposed name to the data file.

3. The computing platform of claim 2, further comprising program instructions stored on the non-transitory computer-readable medium that are executable by the at least one processor to cause the computing platform to:
after applying the proposed name to the data file, place the data file in a common data environment (CDE).

4. The computing platform of claim 1, wherein the indication of the proposed name comprises a selectable indication, the computing platform further comprising program instructions stored on the non-transitory computer-readable medium that are executable by the at least one processor to cause the computing platform to:
receive, from the second client station, one or more communications indicating one or more modifications to the proposed name;
based on the one or more modifications, generate a user-modified version of the proposed name; and
apply the user-modified version of the proposed name to the data file.

5. The computing platform of claim 4, further comprising program instructions stored on the non-transitory computer-readable medium that are executable by the at least one processor to cause the computing platform to:
after applying the user-modified version of the proposed name to the data file, place the data file in a common data environment (CDE).

6. The computing platform of claim 1, wherein the first set of metadata and the second set of metadata are different sets of metadata.

7. The computing platform of claim 1,
wherein the program instructions that are executable by the at least one processor to cause the computing platform to generate the proposed name for the data file comprise program instructions that are executable by the at least one processor to cause the computing platform to, for each data field of the determined naming structure, generate a proposed name segment by populating the data field with the respective metadata value of the first set of metadata that corresponds to the data field; and
wherein the indication of the proposed name comprises the proposed name segments.

8. The computing platform of claim 7, wherein each proposed name segment of the indication is presented in an editable manner.

9. The computing platform of claim 1, wherein the obtained metadata comprises at least one of: metadata generated by the computing platform or metadata that has been received from one or more client stations.

10. The computing platform of claim 1, wherein the first client station and the second client station are the same client station.

11. A non-transitory computer-readable medium, wherein the non-transitory computer-readable medium is provisioned with program instructions that, when executed by at least one processor, cause a computing platform to:
receive, from a first client station, a data file;
obtain metadata associated with the data file;

determine, based on at least a first set of metadata from the obtained metadata associated with the data file, a naming structure to use for the data file, wherein the first set of metadata comprises metadata values for metadata fields, and wherein the determined naming structure (i) is selected from a plurality of predefined naming structures that each defines a respective sequence of data fields, and (ii) includes one or more data fields, each data field corresponding to a respective metadata value of the first set of metadata;

generate, based on the determined naming structure and at least a second set of metadata from the obtained metadata, a proposed name for the data file; and transmit, to a second client station, a communication identifying the proposed name and thereby cause an indication of the proposed name for the data file to be presented at a user interface of the second client station.

12. The non-transitory computer-readable medium of claim 11, wherein the non-transitory computer-readable medium is also provisioned with program instructions that, when executed by the at least one processor, cause the computing platform to:

apply the proposed name to the data file.

13. The non-transitory computer-readable medium of claim 11, wherein the non-transitory computer-readable medium is also provisioned with program instructions that, when executed by the at least one processor, cause the computing platform to:

receive, from the second client station, one or more communications indicating one or more modifications to the proposed name;

based on the one or more modifications, generate a user-modified version of the proposed name; and apply the user-modified version of the proposed name to the data file.

14. The non-transitory computer-readable medium of claim 11, wherein the first set of metadata and the second set of metadata are different sets of metadata.

15. The non-transitory computer-readable medium of claim 11;

wherein the program instructions that, when executed by the at least one processor, cause the computing platform to generate the proposed name for the data file comprise program instructions that, when executed by the at least one processor, cause the computing platform to, for each data field of the determined naming structure, generate a proposed name segment by populating the data field with the respective metadata value of the first set of metadata that corresponds to the data field; and wherein the indication of the proposed name comprises the proposed name segments.

16. A method carried out by a computing platform, the method comprising:

receiving, from a first client station, a data file;

obtaining metadata associated with the data file;

determining, based on at least a first set of metadata from the obtained metadata associated with the data file, a naming structure to use for the data file, wherein the first set of metadata comprises metadata values for metadata fields, and wherein the determined naming structure (i) is selected from a plurality of predefined naming structures that each defines a respective sequence of data fields, and (ii) includes one or more data fields, each data field corresponding to a respective metadata value of the first set of metadata;

generating, based on the determined naming structure and at least a second set of metadata from the obtained metadata, a proposed name for the data file; and transmitting, to a second client station, a communication identifying the proposed name and thereby causing an indication of the proposed name for the data file to be presented at a user interface of the second client station.

17. The method of claim 16, further comprising applying the proposed name to the data file.

18. The method of claim 16, further comprising:

receiving, from the second client station, one or more communications indicating one or more modifications to the proposed name;

based on the one or more modifications, generating a user-modified version of the proposed name; and applying the user-modified version of the proposed name to the data file.

19. The method of claim 16, wherein the first set of metadata and the second set of metadata are different sets of metadata.

20. The method of claim 16, wherein:

generating the proposed name for the data file comprises, for each data field of the determined naming structure, generating a proposed name segment by populating the data field with the respective metadata value of the first set of metadata that corresponds to the data field; and the indication of the proposed name comprises the proposed name segments.

* * * * *